United States Patent
Yoshima et al.

(10) Patent No.: US 9,597,828 B2
(45) Date of Patent: Mar. 21, 2017

(54) METHOD OF MANUFACTURING CYLINDRICAL BONDED MAGNET AND MANUFACTURING EQUIPMENT FOR CYLINDRICAL BONDED MAGNET

(71) Applicant: NICHIA CORPORATION, Anan-shi, Tokushima (JP)

(72) Inventors: Shinji Yoshima, Anan (JP); Muneo Yamamoto, Anan (JP); Shuichi Tada, Anan (JP); Akihiro Imayama, Anan (JP)

(73) Assignee: NICHIA CORPORATION, Anan-shi (JP)

( * ) Notice: Subject to any disclaimer, the term of this patent is extended or adjusted under 35 U.S.C. 154(b) by 806 days.

(21) Appl. No.: 13/727,449

(22) Filed: Dec. 26, 2012

(65) Prior Publication Data
US 2013/0187311 A1 Jul. 25, 2013

(30) Foreign Application Priority Data

Dec. 27, 2011 (JP) .................................. 2011-284850
Jul. 25, 2012 (JP) .................................. 2012-164306

(51) Int. Cl.
*B29C 47/00* (2006.01)
*B29C 47/20* (2006.01)
*B29C 47/92* (2006.01)
*H01F 41/02* (2006.01)

(52) U.S. Cl.
CPC .......... *B29C 47/0004* (2013.01); *B29C 47/20* (2013.01); *B29C 47/92* (2013.01); *H01F 41/028* (2013.01); *B29C 47/0023* (2013.01); *B29C 47/0066* (2013.01); *B29C 2947/92704* (2013.01); *B29K 2995/0008* (2013.01)

(58) Field of Classification Search
CPC ...... B29C 2947/92704; B29C 47/0004; B29C 47/0023; B29C 47/0066; B29C 47/20; B29C 47/92; B29K 2995/0008; B21C 23/085; B30B 11/221; H01F 41/0253; H01F 41/028
USPC ...................................... 264/108, 429; 425/3
See application file for complete search history.

(56) References Cited

FOREIGN PATENT DOCUMENTS

| | | |
|---|---|---|
| EP | 0281295 | 9/1988 |
| JP | 51-69969 U | 9/1975 |
| JP | 06-11514 B2 | 10/1984 |
| JP | 11-150012 | 6/1999 |
| JP | 2001-167963 | 6/2001 |
| JP | 2004-158748 | 6/2004 |
| JP | 2005-223233 | 8/2005 |
| JP | 20007-142090 | 6/2007 |

*Primary Examiner* — Robert J Grun
(74) *Attorney, Agent, or Firm* — Mori & Ward, LLP

(57) ABSTRACT

In a method for manufacturing a cylindrical bonded magnet, a molding space having a cylindrical shape is filled with a bonded magnet composition containing a magnetic material and a resin. The magnetic material disposed in the molding space is magnetically oriented using an orientation magnet. The orientation magnet includes a first permanent magnet and a second permanent magnet. The first and second permanent magnets are disposed such that same poles are opposite each other in the axial direction.

20 Claims, 18 Drawing Sheets

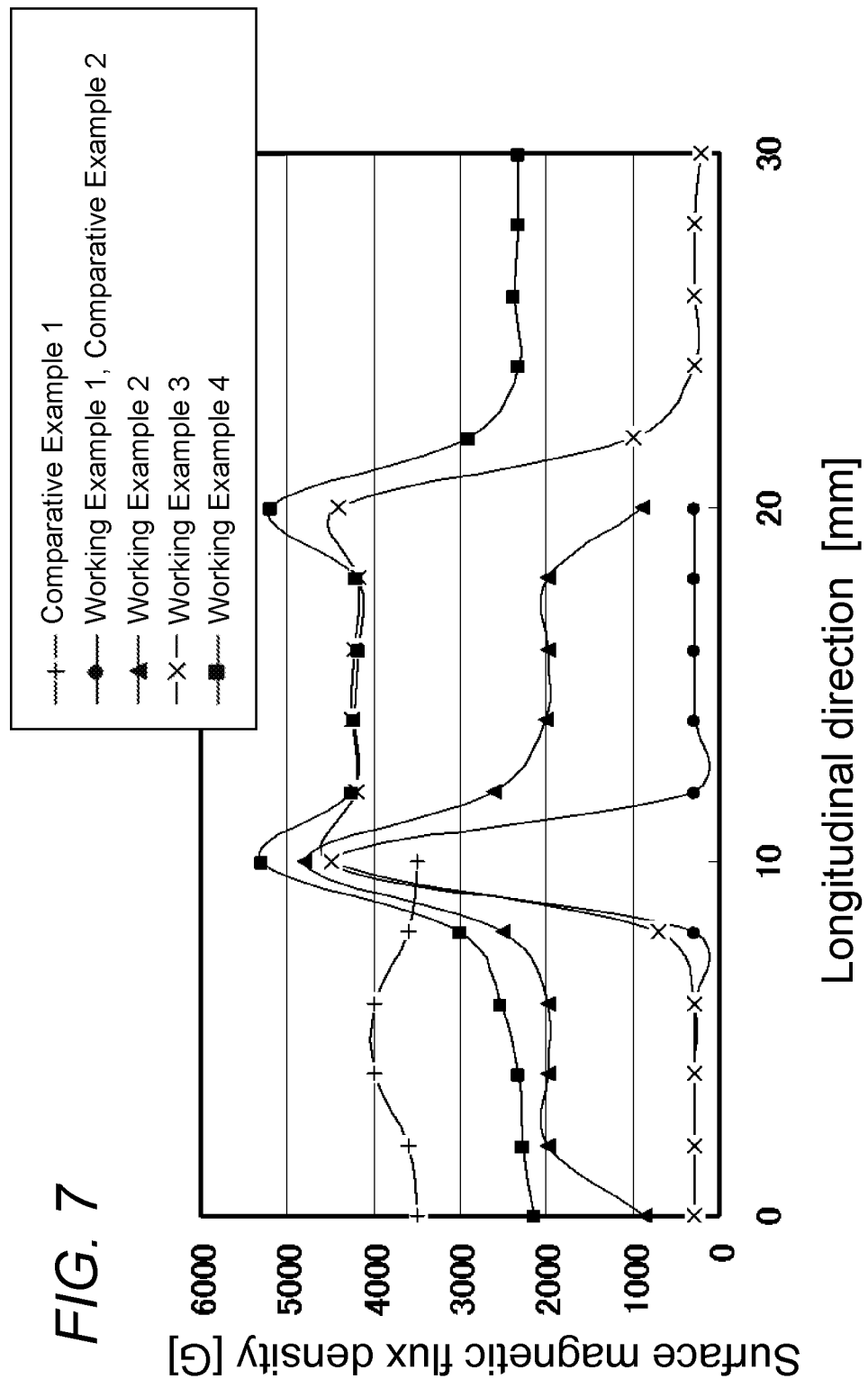

METHOD OF MANUFACTURING CYLINDRICAL BONDED MAGNET AND MANUFACTURING EQUIPMENT FOR CYLINDRICAL BONDED MAGNET

CROSS-REFERENCES TO RELATED APPLICATIONS

The present application claims priority under 35 U.S.C. §119 to Japanese Patent Application No. 2011-284850, filed Dec. 27, 2011 and Japanese Patent Application No. 2012-164306, filed Jul. 25, 2012. The contents of these applications are incorporated herein by reference in their entirety.

BACKGROUND OF THE INVENTION

Field of the Invention

The present invention relates to a method of manufacturing a cylindrical bonded magnet and a manufacturing equipment for the cylindrical bonded magnet.

Discussion of the Background

A bonded magnet composed of a magnetic material and a resin that serves as a binder for the magnetic material can be produced in more complex shapes than a sintered magnet, and also has superior mechanical strength. Therefore, bonded magnets are widely used as electronic parts in permanent magnet-type synchronized motors (DC motors and stepping motors), in laser printer magnet rolls, and so forth.

Methods for manufacturing such bonded magnets can be broadly classified into three types: injection molding, compression molding, and extrusion molding.

Of these manufacturing methods, injection molding involves heating a bonded magnet composition composed of a magnetic material and a thermoplastic resin in the cylinder of an injection molding machine to put the composition into a molten and fluid state, using a plunger to fill the interior of a metal mold, and molding the composition into the desired shape.

Compression molding involves filling a press mold with a bonded magnet composition composed of a magnetic material and a thermosetting resin, and molding under compression.

In the steps of the above-mentioned compression and injection molding methods, there is a set cycle composed of filling a mold with a bonded magnet composition, molding, and taking out the bonded magnet (the molded article), and because this involves what is known as batch production, there is a limit to the production speed.

Also, in injection molding and compression molding, there are limits in terms of molding slender articles such as elongated molded products. One reason is the problem of machining the mold. The shape of the molded article is cut into the mold, but high-precision machining in the depth direction of a mold is extremely difficult. Another reason is a problem in molding. In the case of compression molding, when a slender object is pressed, the pressure is not transmitted to the middle of the molded article. Also, when a slender article is molded by injection molding, the bonded magnet composition ends up cooling down after going through the gate, resulting in a short shot (improper molding due to incomplete filling with the molding material).

In contrast to the above methods, extrusion molding involves heating a bonded magnet composition composed of a magnetic material and a thermoplastic resin or thermosetting resin in a cylinder to melt the composition and put it in a fluid state, and continuously supplying this fluid-state bonded magnet composition to a mold to mold it into the desired shape. Therefore, extrusion molding is a continuous process, unlike the batch process of injection or compression molding, so productivity is much higher. Furthermore, since molding can be performed continuously, the molding of slender articles, which was difficult with injection molding and compression molding, can be accomplished with ease.

The magnetic material that makes up a bonded magnet will now be discussed. The raw material composition of this magnetic material can be classified into magnetic materials that are ferrite based and rare earth based. Ferrites have a long history and are inexpensive, which makes them more popular. Ferrites, however, have weaker magnetism than rare earths, and their magnetism may not be strong enough if the molded article is small. Therefore, with small molded articles it is preferable to use a rare earth-based magnetic material.

Also, from the standpoint of the mechanism by which magnetism is exhibited, the magnetic material that makes up the bonded magnet can be classified into isotropic and anisotropic. Isotropic magnetic materials exhibit the same magnetic force in every direction, whereas anisotropic magnetic materials can exhibit a strong magnetic force in only one direction. Therefore, when an anisotropic magnetic material is made into a bonded magnet, the direction of magnetization of the particles of the magnetic material has to be aligned in a specific orientation to effect anisotropization. This operation is called orientation. This orientation can be broadly broken down into two types: mechanical orientation and magnetic field orientation. "Mechanical orientation" makes use of the fact that when a magnetic material is made up of flat particles, the flat particles align in their thickness direction when a pressure is applied externally to the flat particles during molding. If the flat particles have an axis of easy magnetization in their thickness direction, then the particles of the magnetic material can be mechanically oriented by this operation. "Magnetic field orientation," meanwhile, refers to orienting particles by applying a magnetic field externally during molding. With a ferrite-based magnetic material, mechanical orientation is also possible due to the relation between particle shape and the direction of the axis of easy magnetization, but with a rare earth-based magnetic material, only magnetic field orientation is possible. When an anisotropic magnetic material is used, orientation entails more steps than when an isotropic magnetic material is used, so molding becomes more difficult, but on the other hand the magnetic force is stronger than when an isotropic magnetic material is used.

Cylindrical magnets, which emit magnetic force in the inner circumference direction, are widely used in spindle motors that are installed in hard disk drives and optical media. Nearly all of these are cylindrical bonded magnets obtained by compression molding a bonded magnet composition composed of an isotropic Nd—Fe—B-based magnetic material and a resin. The reason for this is that, as discussed above, with an isotropic Nd—Fe—B-based magnetic material there is no need for a step of orienting the magnetic material during molding, so the molding is extremely simple, and the desired surface magnetic flux waveform can be imparted with just a magnetization step.

However, the only way to increase the surface magnetic flux density of the molded cylindrical bonded magnet is to squeeze in a large quantity of Nd—Fe—B magnetic material per unit volume, and this creates a problem in that the specific gravity of the molded cylindrical bonded magnet ends up being high.

To make a spindle motor smaller and lighter, the cylindrical bonded magnet needs to be even more lightweight and have a higher magnetic force. Therefore, a great deal of research has been conducted into the manufacture of cylindrical bonded magnets by injection molding or compression molding.

Nevertheless, the popularity of anisotropic bonded magnets lags behind that of bonded magnets made with anisotropic Nd—Fe—B-based magnetic materials. The reason for this will be described below.

Let us consider a case in which a cylindrical bonded magnet that emits magnetic force in the inner circumference direction is molded using as the material a bonded magnet composition containing an anisotropic magnetic material. First, in the manufacturing equipment for a bonded magnet, an orientation-use permanent magnet should be disposed in the mold that molds the inner peripheral face of the cylindrical bonded magnet (the molded article).

However, if the molded article is small in size, the size of the individual magnets that make up of the orientation magnet will also be small, so no matter how powerful a permanent magnet is used as a material, the orienting magnetic field that is generated will be weak.

Since it is difficult to orient the magnetic material included in the bonded magnet composition in an orienting magnetic field with a low surface magnetic flux density such as this, the surface magnetic flux density of the cylindrical bonded magnet ends up being low. For example, while the surface magnetic flux density of a cylindrical bonded magnet produced by compression molding using an isotropic Nd—Fe—B-based magnetic material is approximately 2000 G, the surface magnetic flux density of a cylindrical bonded magnet that is a molded article produced by injection molding in a small orienting magnetic field such as this is only approximately 1500 G.

The use of magnets aligned so as to repel each other at outer peripheries in the circumferential direction as an orientation magnet has been studied in an effort to solve this problem of smaller surface magnetic flux density, as disclosed in Japanese Laid-Open Patent Application 2005-223233, for example. When an orientation magnet is thus produced by arranging a plurality of small magnets so as to repel each other at outer peripheries in the circumferential direction, as discussed in Japanese Laid-Open Patent Application 2005-223233, and the surface magnetic flux density measured on an inner periphery of the cylindrical bonded magnet (the molded article) in the circumferential direction is plotted on a graph, the resulting waveform ends up being tapered.

To solve this problem, in Japanese Laid-Open Patent Application 2005-223233 the above-mentioned problem of tapering is solved, and a surface magnetic flux density that approximates a sine wave is obtained, by disposing a magnetic yoke on either side of the molding space and in between a plurality of small magnets that make up the orientation magnet.

One known method for forming an anisotropic bonded magnet is to heat and melt a bonded magnet composition composed of a magnetic material and a resin material inside a mold while performing magnetic field orientation and heat curing the material and subjecting it to injection molding (Japanese Laid-Open Patent Application 2004-158748).

Meanwhile, a known method for the injection molding of a thermosetting resin is to supply a thermosetting resin to an extruder equipped with a screw having a smooth part at the distal end portion, inducing a curing reaction in the gap between the smooth part and the cylinder, and extruding directly to the outside from the cylinder distal end (Japanese Patent Publication H6-11514).

SUMMARY OF THE INVENTION

According to one aspect of the present invention, in a method for manufacturing a cylindrical bonded magnet, a molding space having a cylindrical shape is filled with a bonded magnet composition containing a magnetic material and a resin. The magnetic material disposed in the molding space is magnetically oriented using an orientation magnet. A molten bonded magnet composition is extruded from the molding space in an axial direction of the orientation magnet to mold the molten bonded magnet. The orientation magnet includes a first permanent magnet having N poles and S poles disposed alternately in a circumferential direction, and a second permanent magnet having N poles and S poles disposed alternately in the circumferential direction. The second permanent magnet is disposed adjacent to the first permanent magnet in the axial direction. The first and second permanent magnets are disposed such that same poles are opposite each other in the axial direction.

According to another aspect of the present invention, a manufacturing equipment for a cylindrical bonded magnet includes an external die, an internal die, an orientation magnet, and a screw. The external die has a through-hole. The internal die is disposed in the through-hole. The internal die defines, along with the external die, a molding space having a cylindrical shape. The molding space is provided to be filled with a bonded magnet composition containing a magnetic material and a resin. The orientation magnet is to magnetically orient the magnetic material disposed in the molding space. The screw is to extrude a molten bonded magnet composition in an axial direction of the orientation magnet. The orientation magnet includes a first permanent magnet having N poles and S poles disposed alternately in a circumferential direction, and a second permanent magnet having N poles and S poles disposed alternately in the circumferential direction. The second permanent magnet is disposed adjacent to the first permanent magnet in the axial direction. The first and second permanent magnets are disposed such that same poles are opposite each other in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a graph of the results of measuring surface magnetic flux density in the longitudinal direction of the orientation magnet in the various working and comparative examples of the first embodiment.

DESCRIPTION OF THE EMBODIMENTS

Figure 1:
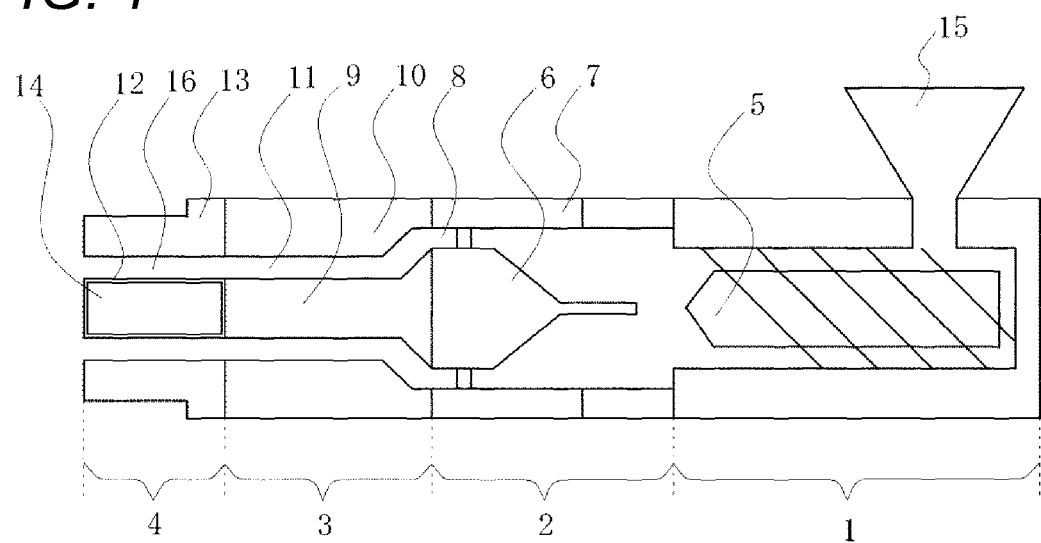
FIG. 1 is a cross section of the manufacturing equipment for the extrusion molding of a bonded magnet according to a first embodiment.

The embodiments will now be described with reference to the accompanying drawings, wherein like reference numerals designate corresponding or identical elements throughout the various drawings.

The size, positional relation, and so forth of the members shown in the drawings may be exaggerated for make the description clearer. In the following description, like names and numbers as a general rule indicate the same or analogous members, and these may not be described again in detail.

First Embodiment

FIG. 1 is a cross section of the manufacturing equipment for the extrusion molding of a bonded magnet according to a first embodiment. The manufacturing equipment for the cylindrical bonded magnet according to the first embodiment will be described through reference to FIG. 1. As shown in FIG. 1, a manufacturing equipment for a cylindrical bonded magnet includes a plasticizer unit 1 that heats and softens a bonded magnet composition composed of a magnetic material and a resin, a spider unit 2 that is provided continuously with the plasticizer unit 1 and causes the molten bonded magnet composition to flow in a cylindrical pattern, a mold unit 3 that is provided continuously with the spider unit 2 and cylindrically molds the bonded magnet composition that has flowed in, and a molding unit 4 that is provided continuously with the mold unit 3 and in which is disposed an orientation magnet 14 that orients the magnetic material and cylindrically molds the bonded magnet composition that has flowed in. The method and equipment for manufacturing the cylindrical bonded magnet according to the first embodiment will now be discussed in detail.

First, as shown in FIG. 1, a bonded magnet composition composed of a magnetic material and a resin is supplied from a hopper 15 to the plasticizer unit 1, where the bonded magnet composition is heated and melted by a screw 5 of the plasticizer unit 1 and thereby put in a fluid state.

Next, the propulsion of the screw 5 feeds the molten bonded magnet composition from the spider unit 2 to the mold unit 3 through a channel 8 formed between a spider 6 of the spider unit 2 and the inner face of an external die 7. With this mold unit 3, a cylindrical channel 11 is formed by an internal die 9 and an external die 10, and the molten bonded magnet composition feed in from the spider unit 2 is fed to the molding unit 4 through this channel 11. By passing through the channel 11, the molten bonded magnet composition is molded into a cylindrical shape, which is the shape of the targeted bonded magnet.

In the molding unit 4, the magnetic material contained in the molten bonded magnet composition is oriented, and the resin contained in the composition is cured. With this molding unit 4, a channel 16 formed by an internal die 12 and an external die 13 is used to feed the molten bonded magnet composition previously fed from the mold unit 3, to the outside of the manufacturing equipment, and also serves as a molding space for the molten bonded magnet composition. Also, the orientation magnet 14 is embedded in the interior of the internal die 12. Therefore, when the molten bonded magnet composition passes through the channel 16, the particles of the magnetic material are readily oriented in the magnetization direction. After this magnetic material has passed through the orienting magnetic field, the resin is cured to obtain a cylindrical bonded magnet as a molded article.

FIGS. 3A to 6B are oblique views of orientation magnets according to a first embodiment, and cross sections along the dotted lines in these oblique views. The magnetization directions are indicated by arrows. As shown in these drawings, the orientation magnets according to the first embodiment are such that two magnets with their same poles together repel each other in the longitudinal direction of the orientation magnet (that is, the extrusion direction of the manufacturing equipment), so that a powerful magnetic field is taken off.

Specifically, many different configurations (orientation magnets 50 to 80) of the orientation magnet 14 according to the first embodiment are conceivable, such as discussed in detail in (1) to (4) below, but the present invention is not limited to this.

Figure 3A:
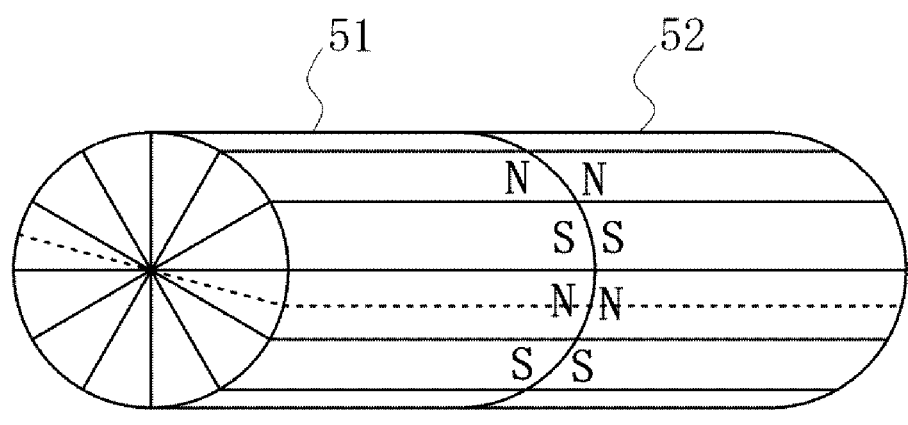
FIGS. 3A and 3B are an oblique view and cross section of an orientation magnet in Working Example 1.

(1) As shown in FIG. 3A, the orientation magnet 50 is configured such that a cylindrical first permanent magnet 51 in which a plurality of magnet pieces are arranged so that N poles and S poles appear alternately in the circumferential direction, and a cylindrical second permanent magnet 52 in which a plurality of magnet pieces are arranged so that N poles and S poles similarly appear alternately are disposed so that their N poles and S poles repel each other in parallel with respect to the extrusion direction.

These cylindrical first and second permanent magnets 51 and 52 may be hollow cylindrical magnets, in which the interior is empty to the extent that magnetic force is not lost. The same applies to the other embodiments discussed below. The orientation magnets shown in FIG. 3A may be used as one set, and a plurality of these sets may be connected together with yokes (made of iron, for example) in between, etc., to configure an orientation magnet. The same applies to the other embodiments discussed below.

Figure 3B:
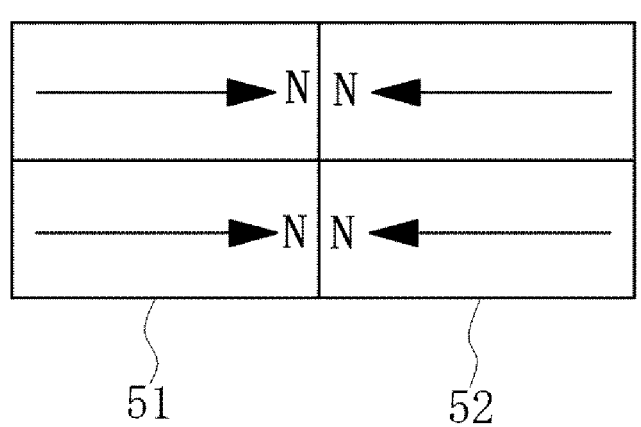

If the orientation magnet 50 shown in FIG. 3A is cut at the place indicated by the dotted line in FIG. 3A, as shown in FIG. 3B, the magnetization directions (the point of each arrow is the N pole) face each other at the boundary where the first permanent magnet 51 and the second permanent magnet 52 are connected.

With this orientation magnet 50, a powerful magnetic force can be emitted outward (in particular, toward the channel 16 inside the molding unit 4) from the face where the first permanent magnet 51 and the second permanent magnet 52 are connected. The surface magnetic flux density in the longitudinal direction of the orientation magnet 50 shown in FIG. 3A was measured, and is given as Working Example 1 in FIG. 7, for example.

Figure 4A:
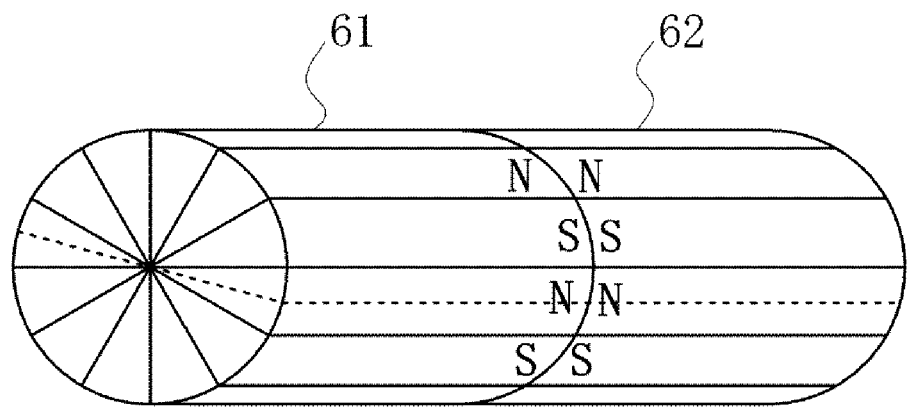
FIGS. 4A and 4B are an oblique view and cross section of an orientation magnet in Working Example 2.

(2) As shown in FIG. 4A, an orientation magnet is configured such that a column first permanent magnet 61 in which a plurality of magnet pieces are arranged so that N poles and S poles appear alternately in the circumferential direction, and a column second permanent magnet 62 in which a plurality of magnet pieces are arranged so that N poles and S poles similarly appear alternately in the circumferential direction are disposed so that their N poles and S poles repel each other in inclined directions with respect to the extrusion direction (in FIG. 4B, the diagonal directions of the rectangular cross sections of the magnet pieces) and so that magnetization directions face toward outer peripheries in the circumferential direction.

Figure 4B:
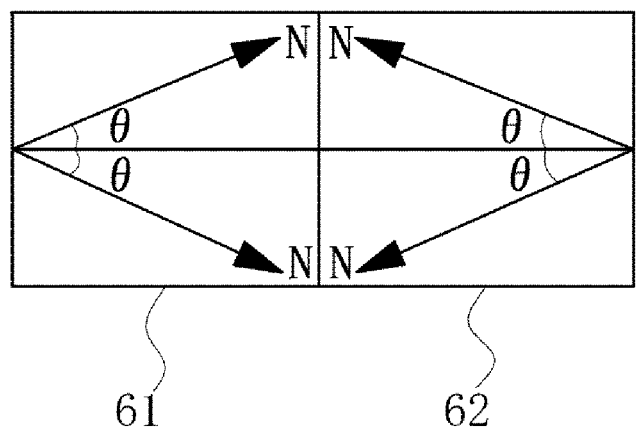

The "inclined directions" here is the direction of the angle θ in FIG. 4B, and shall refer to a direction at an angle of more than 0 degrees and less than 90 degrees with respect to the extrusion direction of the bonded magnet composition (that is, the axial direction of the orientation magnet). The same applies to the other embodiments discussed below.

When the orientation magnet shown in FIG. 4A is cut at the place indicated by the dotted line in FIG. 4A, as shown in FIG. 4B, the magnetization directions (the points of the arrows are the N pole) match up with each other diagonally outward to the boundary at which the first permanent magnet 61 and the second permanent magnet 62 are connected.

A powerful magnetic force can be emitted outward (in particular, toward the channel 16 inside the molding unit 4) from the face where the first permanent magnet 61 and the second permanent magnet 62 are connected. The surface magnetic flux density in the longitudinal direction of the orientation magnet 60 shown in FIG. 4A was measured, and is given as Working Example 2 in FIG. 7, for example.

Figure 5A:
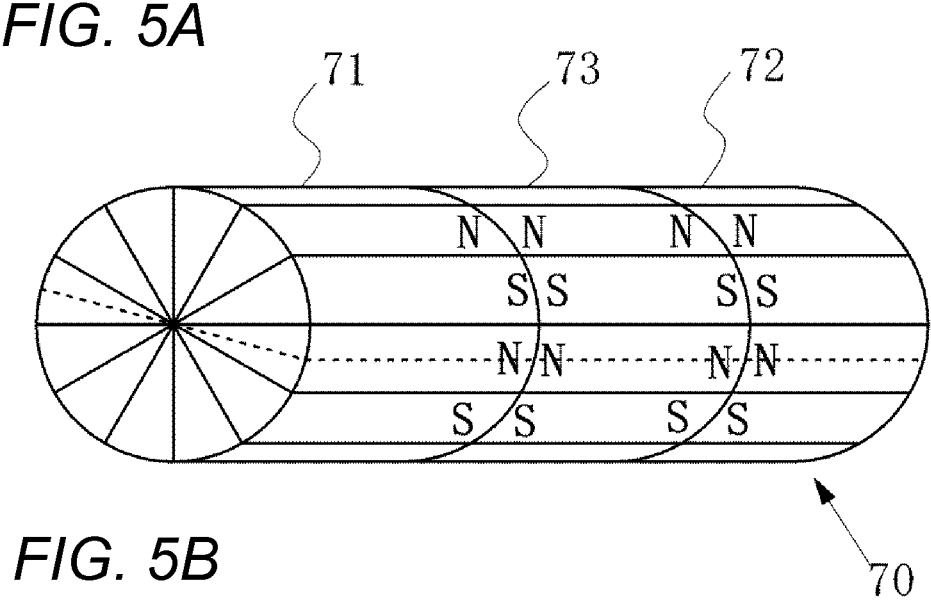
FIGS. 5A and 5B are an oblique view and cross section of an orientation magnet in Working Example 3.

(3) As shown in FIG. 5A, a column third permanent magnet 73 is produced by arranging a plurality of magnet pieces so that the N poles and S poles appear alternately in the radial direction. This third permanent magnet 73 is disposed in the middle, and column first and second permanent magnets 71 and 72 in which a plurality of magnet pieces are arranged so that the N poles and S poles appear alternately in the circumferential direction are disposed adjacent on either side in the axial direction of the third permanent magnet 73, thereby producing an orientation magnet 70. Specifically, the third permanent magnet 73 is disposed to be sandwiched between the first permanent magnet 71 and the second permanent magnet 72 in the axial direction.

Figure 5B:
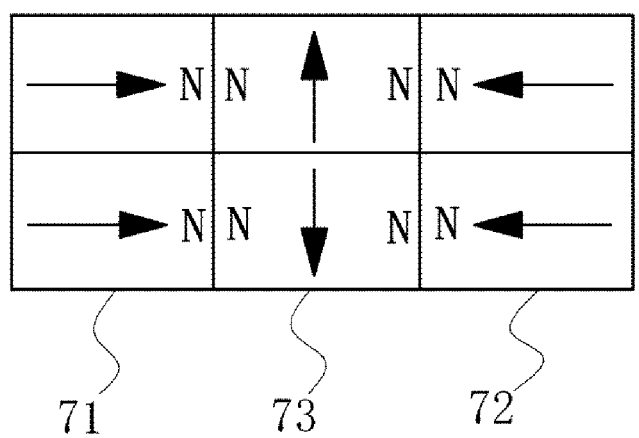

When the orientation magnet shown in FIG. 5A is cut at the place indicated by the dotted line in FIG. 5A, as shown in FIG. 5B, the magnetization directions (the points of the arrows are the N pole) are mutually perpendicular between the first and second permanent magnets 71 and 72 and the third permanent magnet 73, and between the first permanent magnet 71 and the second permanent magnet 72 the magnetization directions (the points of the arrows are the N pole) face toward the third permanent magnet 73 and are opposite each other and parallel to the extrusion direction.

This orientation magnet 70 can emit a more powerful magnetic force from the orientation magnet 70 as a whole, because of the magnetic force facing outward (in particular, toward the channel 16 inside the molding unit 4) from the interfaces at the two places where the first and second permanent magnets 71 and 72 are connected to the third permanent magnet 73, and the magnetic force facing outward (in particular, toward the channel 16 inside the molding unit 4) from the center of the third permanent magnet 73. The surface magnetic flux density in the longitudinal direction of the orientation magnet 70 shown in FIG. 5A is measured, and is given as Working Example 3 in FIG. 7, for example.

Figure 6A:
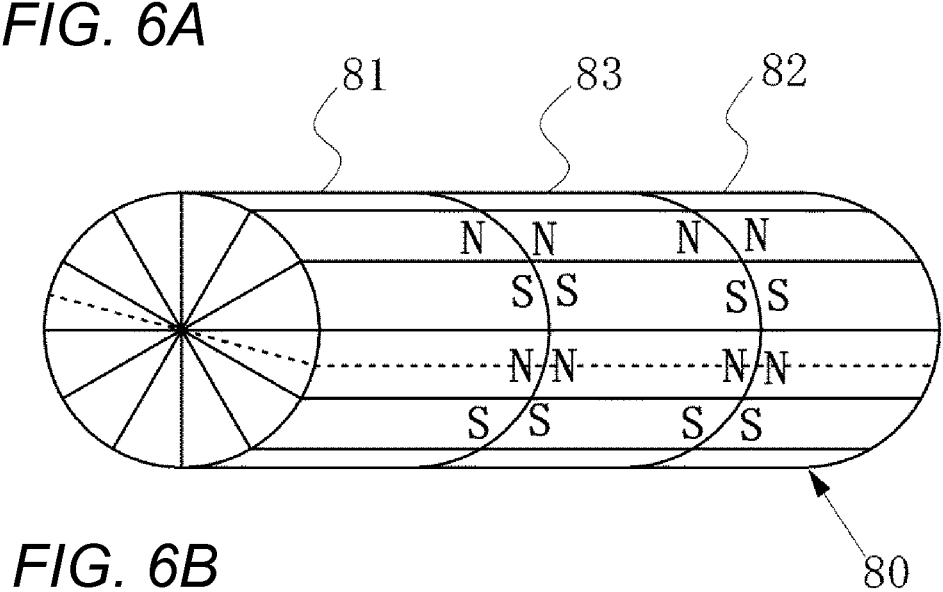
FIGS. 6A and 6B are an oblique view and cross section of an orientation magnet in Working Example 4.

(4) As shown in FIG. 6A, a cylindrical third permanent magnet 83 is produced by arranging a plurality of magnet pieces so that the N poles and S poles appear alternately in the radial direction. This third permanent magnet 83 is disposed in the middle, and cylindrical first and second permanent magnets 81 and 82 in which a plurality of magnet pieces are arranged so that the N poles and S poles appear alternately in the circumferential direction are disposed adjacent on either side in the axial direction of the third permanent magnet 83, thereby producing an orientation magnet 80. Specifically, the third permanent magnet 83 is disposed to be sandwiched between the first permanent magnet 81 and the second permanent magnet 82 in the axial direction.

The first and second permanent magnets 81 and 82 are such that the magnetization directions connecting the N poles and S poles are inclined with respect to the extrusion direction (in FIG. 6B, the diagonal directions of the rectangular cross sections of the magnet pieces), and an orientation magnet is configured such that these repel a third permanent magnet 83 at an outer periphery in the circumferential direction.

Figure 6B:
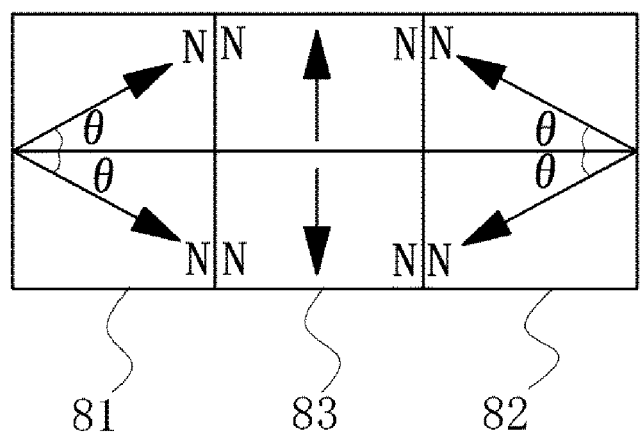

When the orientation magnet shown 80 in FIG. 6A is cut at the place indicated by the dotted line in FIG. 6A, as shown in FIG. 6B, the magnetization directions (the points of the arrows are the N pole) match up with each other diagonally toward the outer periphery between the first permanent magnet 81 and the second permanent magnet 82, and between the first and second permanent magnets 81 and 82 and the third permanent magnet 83 the magnetization directions are opposite each other diagonally toward the outer periphery of the third permanent magnet 83. The "inclination direction" of the first and second permanent magnets 81 and 82 here is the diagonal direction of the rectangular cross sections of the magnet pieces shown in FIG. 6B.

This orientation magnet 80 can emit a more powerful magnetic force because of the magnetic force facing outward (in particular, toward the channel 16 inside the molding unit 4) from the interfaces at the two places where the first and second permanent magnets 81 and 82 are connected to the third permanent magnet 83, and the magnetic force facing outward (in particular, toward the channel 16 inside the molding unit 4) from the center of the third permanent magnet 83. The surface magnetic flux density in the longitudinal direction of the orientation magnet 80 shown in FIG. 6A was measured, and is given as Working Example 4 in FIG. 7, for example.

As shown in FIG. 7, which expresses the surface magnetic flux density in the longitudinal direction of the orientation magnet, the place where the magnetic force obtained by repulsion of the first and second orientation-use permanent magnets is generated is substantially a single point. However, the magnetic force created at this point is extremely strong. This is clear from a comparison of the magnetic force of a conventional orientation magnet. The extrusion molding according to the first embodiment is continuous molding, rather than the batch process used in injection molding or compression molding, so the molten bonded magnet composition always continuously passes under a powerful orienting magnetic field at just this one point. Accordingly, a molded article of the bonded magnet will be oriented uniformly and to a high degree in its longitudinal direction, and a high surface magnetic flux density can be obtained.

The orientation magnets shown in FIGS. 3A to 6B cannot in fact be applied to injection molding or compression molding. The reason is that since injection molding and compression molding are not methods in which the bonded magnet composition continuously fills the mold as in the extrusion molding, they end up producing a bonded magnet that emits a strong magnetic force from just one point in the longitudinal direction, and a high surface magnetic flux density, with the magnet oriented uniformly and to a high degree, cannot be obtained.

The material for the magnet used in the orientation-use permanent magnets preferably has a Br of at least 1T, and an Nd—Fe—B-based sintered magnet or an Sm—Co-based sintered magnet can be used, for example. When a magnet with a high magnetic force is used, the orienting magnetic field is stronger, and the surface magnetic flux density of the bonded magnet is higher.

The bonded magnet obtained by extrusion molding as discussed above may undergo a magnetization step if needed. Performing magnetization further boosts the surface magnetic flux density.

The magnetic material used in the first embodiment can be an anisotropic magnetic material. Examples of anisotropic magnetic materials include those based on ferrite, Sm—Co, Nd—Fe—B, Sm—Fe—N, and so on. Just one type of the above-mentioned magnetic material may be used, or a mixture of two or more types may be used. If needed, an antioxidation treatment or coupling treatment may be performed.

There are no particular restrictions on the resin used in the first embodiment, but examples of resins that can be used include polypropylene, polyethylene, polyvinyl chloride, polyester, polyamide, polycarbonate, polyphenylene sulfide, acrylic resin, and other such thermoplastic resins; ester-based elastomer, polyamide-based elastomer, and other such thermoplastic elastomer; epoxy resins, phenolic resins, and other such thermosetting resins; and natural rubber, isoprene rubber, styrene butadiene rubber, butadiene rubber, chloroprene rubber, nitrile rubber, butyl rubber, ethylene propylene rubber, urethane rubber, silicone rubber, acrylic rubber, chlorosulfonated polyethylene rubber, fluoro-rubber, hydrogenated nitrile rubber, epichlorohydrin rubber, liquid rubber, and other such rubber materials.

The blend ratio between the magnetic material and the resin will depend on the type of resin, but the ratio of the magnetic material to the entire bonded magnet composition is preferably from 45 to 65 vol %. An antioxidant, lubricant, or the like can also be added.

WORKING EXAMPLES

Working examples of the first embodiment will now be described in detail. It should go without saying that the present invention is not limited to the following working examples alone.

Working Example 1

Preparation of Magnetic Material

The magnetic material is an anisotropic Sm—Fe—N-based magnetic material (average particle size of 3 μm).
Production of Bonded Magnet Composition First, the Sm—Fe—N-based magnetic material is surface treated with ethylene silicate and a silane coupling agent. 9137 g of the surface treated Sm—Fe—N-based magnetic material is mixed with 863 g of 12 nylon (PA12) in a mixer. The mixed powder thus obtained is kneaded at 220° C. in a biaxial kneader and cooled, after which the product is cut to a suitable size to obtain a bonded magnet composition.
Extrusion Molding FIG. 3A shows the orientation magnet 50 used in Working Example 1. Extrusion molding was performed using the orientation magnet 50 in FIG. 3A. The inside diameter of the external die is 19 mm, and the outside diameter of the internal die was 17 mm. An orientation magnet is produced by bonding together the same poles of the first permanent magnet 51 and the second permanent magnet 52 oriented in the extrusion direction. The magnetization directions of the first permanent magnet 51 and the second permanent magnet 52 are 0° with respect to the axial direction. The size of each of the first and second permanent magnets 51 and 52 is 16 mm in diameter and 10 mm long, and these are embedded in the internal die 12. The partition separating the orientation magnet and the channel 11 is 0.5 mm. The mold temperature during extrusion molding is set to 200° C., and the material is cooled to an exit temperature of 165° C. In this manner, a radial 12-pole, anisotropic, cylindrical bonded magnet with an outside diameter of 19 mm, an inside diameter of 17 mm, and a length of 1000 mm was obtained. This is then cut to a length of 20 mm using a cutting machine. The molded article thus obtained is magnetized with a magnetization yoke. The magnetization conditions are an electrostatic capacitance of 1000 μF, a voltage of 2.5 kV, and a current of 18.0 kA.

Working Example 2

Preparation of Magnetic Material

The same magnetic material as in Working Example 1 is used.
Production of Bonded Magnet Composition The same bonded magnet composition as in Working Example 1 is produced using the same magnetic material as in Working Example 1.
Extrusion Molding FIG. 4A shows the orientation magnet 60 used in Working Example 2. Other than changing the orientation magnet 50 in Working Example 1 above to the orientation magnet 60 shown in FIG. 4A, extrusion molding was performed in the same manner as in Working Example 1. The orientation magnet 60 is so provided that same poles of the first permanent magnet 61 and the second permanent magnet 62, which have diagonal magnetization directions facing outward with respect to the extrusion direction, are bonded together. The magnetization directions of the first permanent magnet 61 and the second permanent magnet 62 are 50° in terms of the angle (θ) measured toward the outer periphery from the axial direction.

Working Example 3

Preparation of Magnetic Material

The same magnetic material as in Working Example 1 is used.
Production of Bonded Magnet Composition
The same bonded magnet composition as in Working Example 1 is produced using the same magnetic material as in Working Example 1.
Extrusion Molding
FIG. 5A shows the orientation magnet 70 used in Working Example 3. Other than changing the orientation magnet 50 in Working Example 1 above to the orientation magnet 70 shown in FIG. 5A, extrusion molding was performed in the same manner as in Working Example 1. The orientation magnet 70 is so provided that the third permanent magnet 73, which has its magnetization direction in the radial direction perpendicular to the extrusion direction, is disposed in the middle. The first and second permanent magnets 71 and 72, which have magnetization directions parallel to the extrusion direction, are disposed on the left and right of the third permanent magnet 73, with the same poles of the first permanent magnet 71 and the second permanent magnet 72 bonded together on the left and right sides of the third permanent magnet 73. The magnetization directions of the first permanent magnet 71 and the second permanent magnet 72 are 0° with respect to the axial direction.

Working Example 4

Preparation of Magnetic Material

The same magnetic material as in Working Example 1 is used.
Production of Bonded Magnet Composition
The same bonded magnet composition as in Working Example 1 is produced using the same magnetic material as in Working Example 1.
Extrusion Molding
FIG. 6A shows the orientation magnet 80 used in Working Example 4. Other than changing the orientation magnet 50 in Working Example 1 above to the orientation magnet 80 shown in FIG. 6A, extrusion molding was performed in the same manner as in Working Example 1. The orientation magnet 80 is so provided that the third permanent magnet 83, which has its magnetization direction in the radial direction perpendicular to the extrusion direction, is disposed in the middle. The first and second permanent magnets 81 and 82, which have diagonal magnetization directions facing radially outward with respect to the extrusion direction, are disposed on the left and right, with the same poles of the first permanent magnet 81 and the second permanent magnet 82 bonded together on the left and right sides of the third permanent magnet 83. The magnetization directions of the first permanent magnet 81 and the second permanent magnet 82 are 50° in terms of the angle (θ) measured toward the outer periphery from the axial direction.

Comparative Example 1

Preparation of Magnetic Material

Figure 2A:
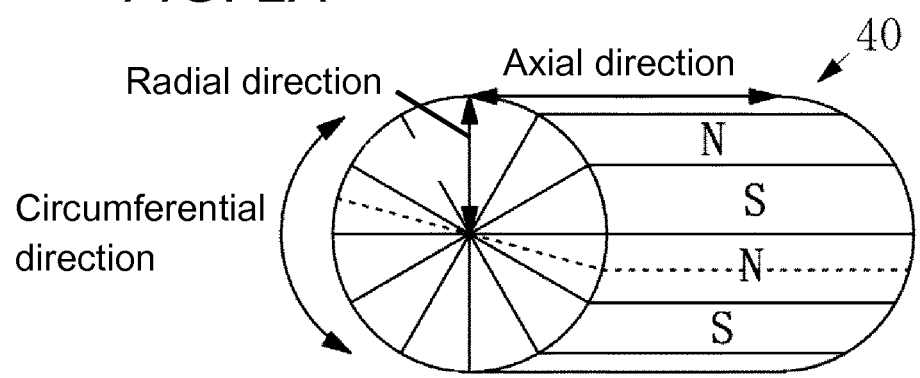
FIGS. 2A and 2B are an oblique view and cross section of an orientation magnet in Comparative Example 1, for comparison with the first embodiment.
Figure 2B:
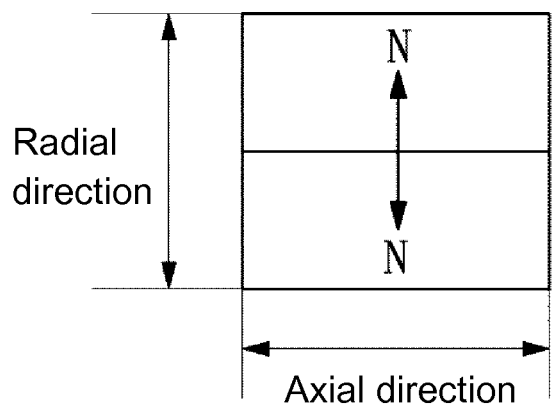

The same magnetic material as in Working Example 1 is used.
Production of Bonded Magnet Composition
The same bonded magnet composition as in Working Example 1 is produced using the same magnetic material as in Working Example 1.
Extrusion Molding
FIGS. 2A and 2B are an oblique view and a cross section of the orientation magnet 40 in Comparative Example 1, which is given for the sake of comparison with Working Example 1. FIG. 2B is a cross section at the place indicated with the dotted line in FIG. 2A. Other than changing the orientation magnet 50 in Working Example 1 above to the orientation magnet 40 shown in FIG. 2A, extrusion molding was performed in the same manner as in Working Example 1.

Comparative Example 2

Preparation of Magnetic Material

The same magnetic material as in Working Example 1 was used.
Production of Bonded Magnet Composition
The same bonded magnet composition as in Working Example 1 is produced using the same magnetic material as in Working Example 1.
Injection Molding
A bonded magnet composition is melted in a plasticizer unit heated to 200° C., and the bonded magnet composition is injected into a mold heated to 90° C., which gives a molded article. The shape of the molding space is such that the outside diameter (ϕ) is 19 mm, the inside diameter (ϕ) is 17 mm, and the length (L) is 20 mm. The orientation magnet shown in FIG. 3A is disposed in the molding space of the mold. The size of the orientation magnet is such that the radius (r) is 16 mm and the length (L) is 20 mm. The partition separating the orientation magnet 50 and the molding space is 0.5 mm. The molded article thus obtained is magnetized with a magnetization yoke. The magnetization conditions are an electrostatic capacitance of 1000 µF, a voltage of 2.5 kV, and a current of 18.0 kA.

Comparative Example 3

Preparation of Magnetic Material

The magnetic material is an isotropic Nd—Fe—B-based magnetic material.

The bonded magnet composition is produced using the isotropic Nd—Fe—B-based magnetic material.

Compression Molding

A mold having a molding space with an outside diameter ($\phi$) of 19 mm, an inside diameter ($\phi$) of 17 mm, and a length (L) of 20 mm is filled with the bonded magnet composition. A pressure of 500 MP is applied with a press. The bonded magnet molded article is taken out of the mold and the resin is cured for 10 hours in a 150° C. oven. This gives an isotropic bonded magnet molded article with an outside diameter ($\phi$) of 19 mm, an inside diameter ($\phi$) of 17 mm, and a length (L) of 20 mm. The molded article thus obtained is magnetized with a magnetization yoke. The magnetization conditions are an electrostatic capacitance of 1000 µF, a voltage of 2.5 kV, and a current of 18.0 kA.

of measuring the surface magnetic flux density in the circumferential direction of the cylindrical bonded magnets in the various working and comparative examples (for 30° of rotation).

Figure 9:
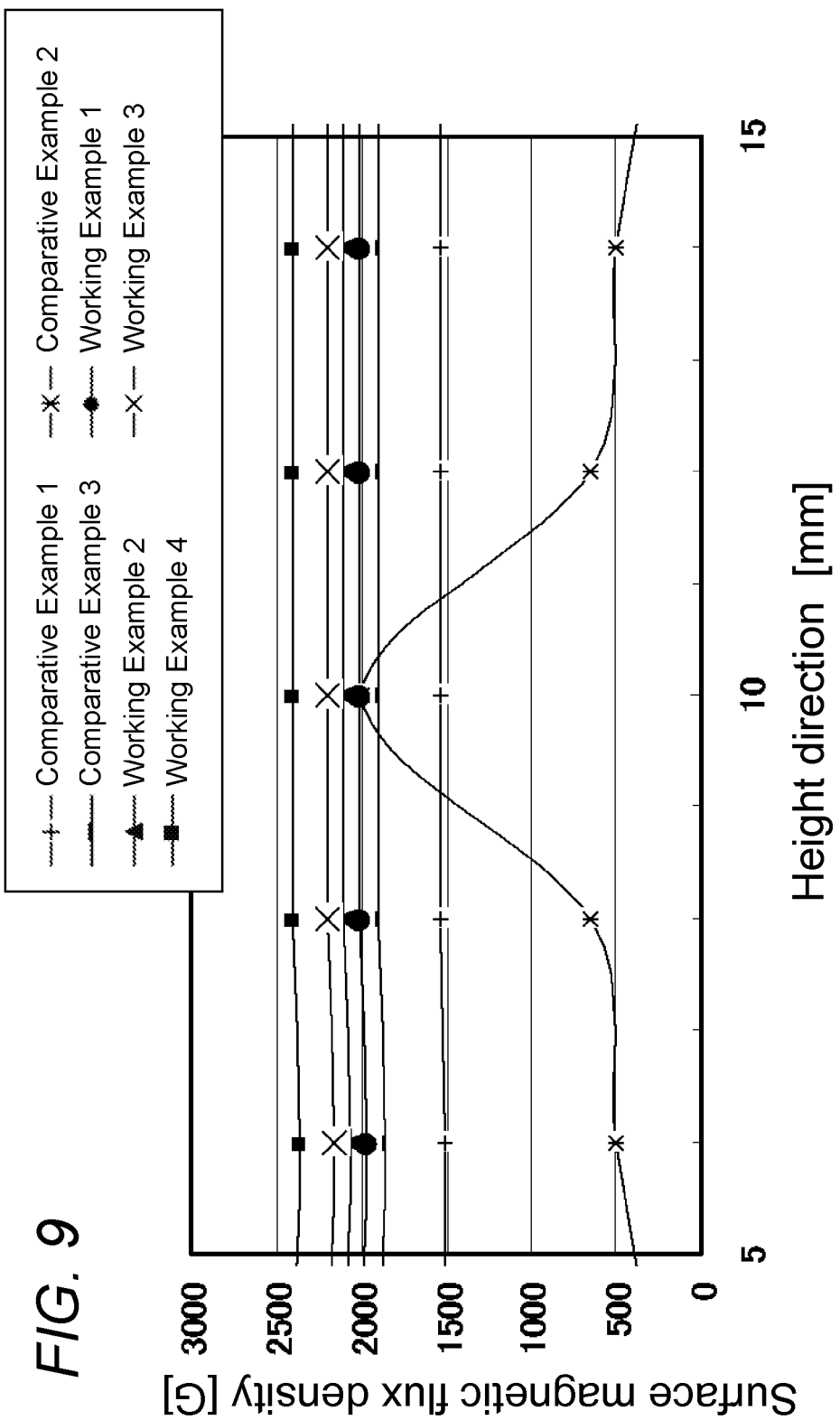
FIG. 9 is a graph of the results of measuring surface magnetic flux density in the height direction of the cylindrical bonded magnet in the various working and comparative examples of the first embodiment.

Measurement of Surface Magnetic Flux Density in Height Direction of Cylindrical Bonded Magnet The surface magnetic flux density in the height direction of the cylindrical bonded magnet was measured with a Gauss meter. This measurement was performed by moving a probe from 5 mm to 15 mm in the height direction with respect to the peak of a single N pole of a cylindrical bonded magnet with a height of 20 mm. FIG. 9 shows the results of measuring the surface magnetic flux density in the height direction of the cylindrical bonded magnets in the various working and comparative examples. In the evaluation results in Table 1 below, "○" means that the variance in the surface magnetic flux was less than 5%, "Δ" means 5 to 20%, and "x" means greater than 20% in the height direction.

Density Measurement

The density of the bonded magnets obtained in the working and comparative examples given above was measured by the Archimedes method.

The above-mentioned evaluation results are compiled in Table 1 below.

TABLE 1

| | Molding method | Orientation magnet | Orienting magnetic field (G) | Magnetic powder | Resin | Surface magnetic flux density (G) | Variance in surface magnetic flux (height direction) | Density (g/cm³) |
|---|---|---|---|---|---|---|---|---|
| W. E. 1 | Extrusion | FIG. 3A AND 3B | 4500 | Anisotropic Sm—Fe—N | PA12 | 2000 | ○ | 4.8 |
| W. E. 2 | Extrusion | FIG. 4A AND 4B | 4800 | Anisotropic Sm—Fe—N | PA12 | 2100 | ○ | 4.8 |
| W. E. 3 | Extrusion | FIG. 5A AND 5B | 4500 | Anisotropic Sm—Fe—N | PA12 | 2200 | ○ | 4.8 |
| W. E. 4 | Extrusion | FIG. 6A AND 6B | 5300 | Anisotropic Sm—Fe—N | PA12 | 2400 | ○ | 4.8 |
| C. E. 1 | Extrusion | FIG. 2A AND 2B | 4000 | Anisotropic Sm—Fe—N | PA12 | 1500 | ○ | 4.8 |
| C. E. 2 | Injection | FIG. 3A AND 3B | 4500 | Anisotropic Sm—Fe—N | PA12 | 2000 | x | 4.8 |
| C. E. 3 | Compression | None | — | Isotropic Nd—Fe—B | Epoxy | 1900 | ○ | 6.0 |

W. E.: Working Example, C. E.: Comparative Example

Evaluation

Measurement of Orienting Magnetic Field

The orienting magnetic field of the orientation magnets in the working and comparative examples given above was measured with a Gauss meter. The measurement was performed by embedding the orientation magnet in a mold, and moving a probe in the longitudinal direction of the orientation magnet with respect to the peak of a single N pole. FIG. 7 shows the results of measuring the surface magnetic flux density in the longitudinal direction of the orientation magnets in the various working and comparative examples.

Figure 8:
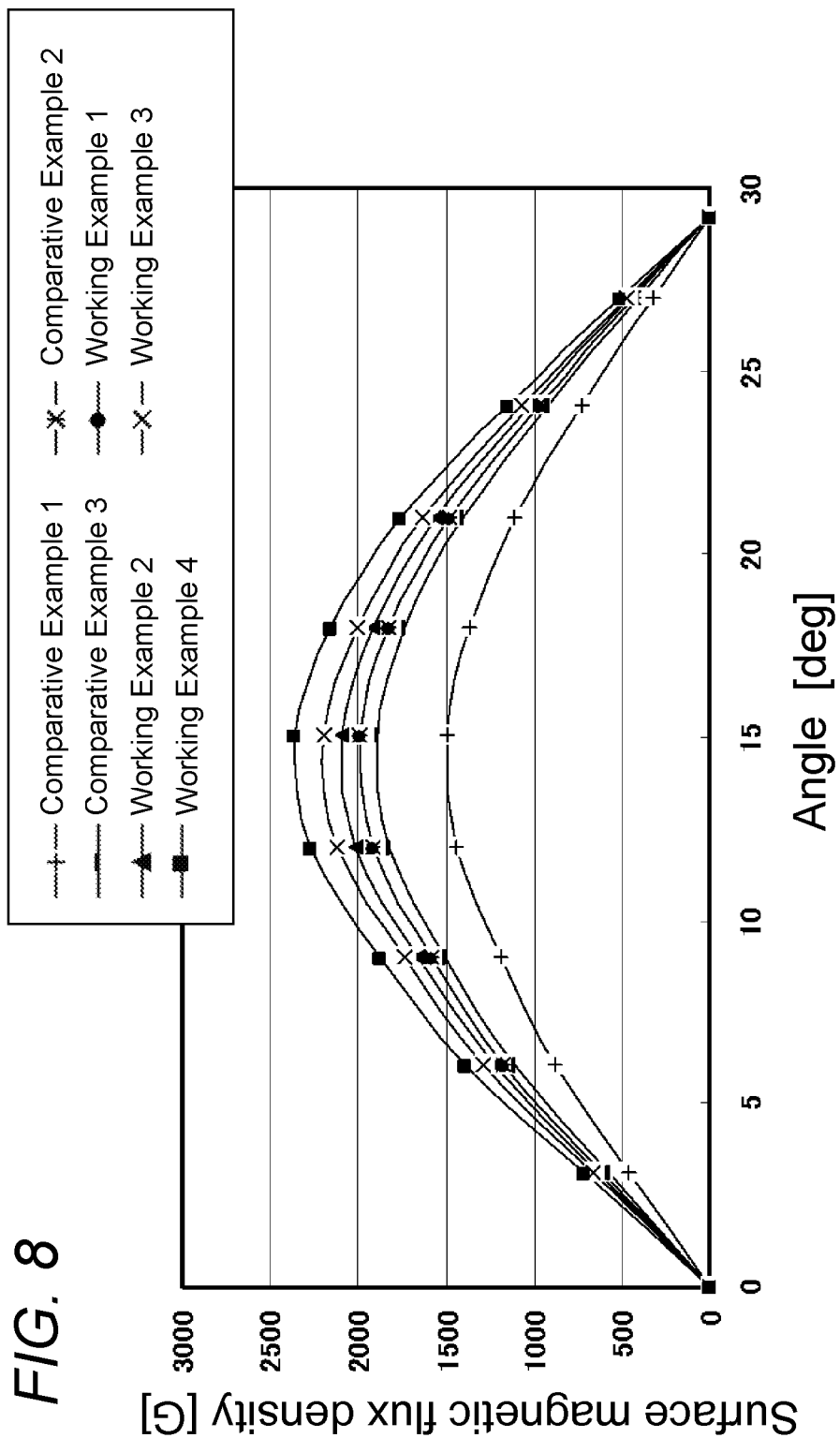
FIG. 8 is a graph of the results of measuring surface magnetic flux density in the circumferential direction of the cylindrical bonded magnet in the various working and comparative examples of the first embodiment.

Measurement of Surface Magnetic Flux Density in Radial Direction of Bonded Magnet Molded Article The cylindrical bonded magnets obtained in the working and comparative examples above were measured for surface magnetic flux density at the inner periphery of the cylindrical bonded magnets. The measurement was performed by fixing the cylindrical bonded magnet on a 360° rotating stage of a magnet analyzer, bringing a probe into contact with the inner peripheral face of the cylindrical bonded magnet, and rotating the stage 360°. FIG. 8 shows the results Analysis of Results It can be seen that the surface magnetic flux is higher in all of the working examples in the first embodiment than in Comparative Example 1. It can be seen that this is the effect of configuring the orientation magnet so that the magnets repel in the longitudinal direction, which is a feature of the first embodiment.

As shown in FIG. 9, in Comparative Example 2, in which the cylindrical bonded magnet was formed by injection molding, there is variance in the surface magnetic flux density in the height direction, and the surface magnetic flux density is not as uniform in the height direction as in the working examples in which the cylindrical bonded magnets were formed by extrusion molding. Specifically, the surface magnetic flux density rises at the center point of height. This tells us that the configuration of the orientation magnet according to the first embodiment exhibits its effect only in combination with extrusion molding.

It can also be seen that the density in all of the above-mentioned working examples is lower than the density in Comparative Example 3. Specifically, lighter cylindrical bonded magnets can be manufactured by keeping the surface magnetic flux density substantially the same. In other words, it can be seen that the magnets according to the first embodiment can be reduced in weight, without lowering the magnetic force, as compared to magnets obtained by compression molding the isotropic Nd—Fe—B-based magnetic material that is widely used in spindle motors.

Working Examples 3 and 4 have high surface magnetic flux density. This indicates that a high magnetic field is generated over a wide region in the longitudinal direction, as shown in FIG. 7, as a result of having the orientation magnet made up of three permanent magnets.

Second Embodiment

A thermosetting resin and a thermoplastic resin were used in the first embodiment above, but when a thermosetting resin is used, an extrusion molding equipment may be used as described below.

Figure 10:
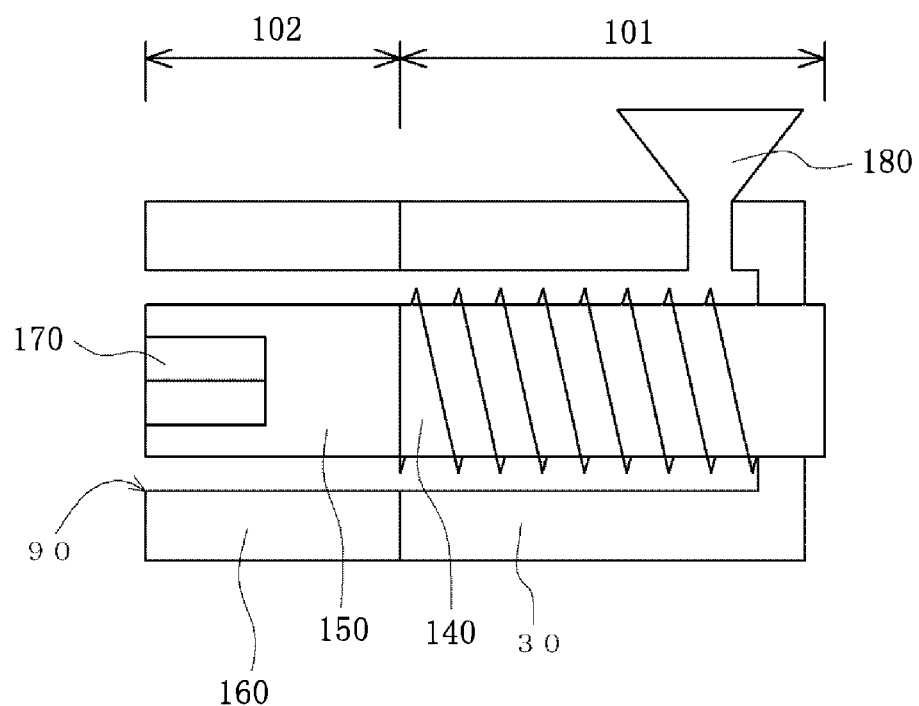
FIG. 10 is a diagram illustrating an extrusion molding equipment according to a second embodiment.

FIG. 10 is a diagram (cross section) illustrating an overall view of the injection molding equipment used in the second embodiment. This extrusion molding equipment has a screw unit 101 for extruding a bonded magnet composition (containing an anisotropic magnetic material and a thermosetting resin) forward as shown in FIG. 10, and a mold unit 102 including an external die 160 and an internal die 150 connected to a screw 140.

The external die 160 has a through-hole for forming the outer periphery of the cylindrical bonded magnet, and the internal die 150 for forming the inner periphery of the bonded magnet is disposed inside this through-hole. The internal die 150 is able to rotate by being connected to the screw 140, and an orientation magnet 170 is embedded in the interior of the internal die 150.

In the screw unit 101, the screw 140 feeds the bonded magnet composition, which is a mixture of an anisotropic magnetic material and a thermosetting resin, to the mold unit 102. The bonded magnet composition may be in jelly-like or solid format room temperature. The bonded magnet composition is supplied from a hopper 180 into a cylinder 30. The cylinder 30 is provided around the outer periphery of the screw 140, and the cylinder 30 is heated as needed to put the bonded magnet composition into a more easily fed state. This heating, however, needs to be controlled to the extent that the bonded magnet composition do not undergo a crosslinking reaction. Conversely, the cylinder 30 may be cooled if a large amount of heat is generated by shearing force between the screw 140 and the cylinder 30.

The bonded magnet composition feed into the mold unit 102 is put into a cylindrical shape by the space created by the inside diameter of the external die 160 and the outside diameter of the internal die 150 connected to the screw 140. Specifically, the inner periphery of the cylindrical bonded magnet that is formed corresponds to the outside diameter of the internal die 150, and the outer periphery of the bonded magnet corresponds to the inside diameter of the external die 160. The outer and inner peripheries of the bonded magnet molded article can be freely changed by changing the outside diameter of the internal die 150 and the inside diameter of the external die 160.

As the bonded magnet composition proceeds forward, the orientation magnet 170 is embedded in the internal die 150. The "embedding" referred to here means a state in which at least part is embedded within the internal die 150, and part may be exposed at the portion not in contact with the bonded magnet composition.

Figure 11:
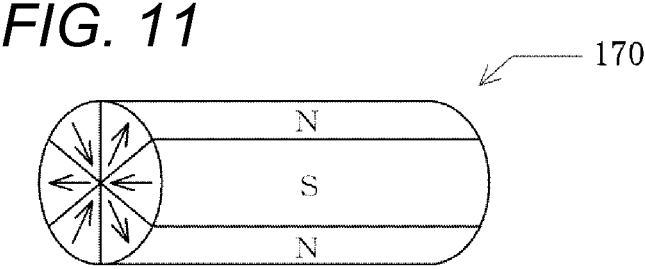
FIG. 11 is a diagram illustrating the magnetization directions of the orientation magnet shown in FIG. 10.

FIG. 11 is a detail view of an example of the orientation magnet 170. This is an orientation magnet for forming an inner peripheral six-pole bonded magnet, has a solid cylindrical shape, and is made of six magnet pieces. The number of poles of the bonded magnet molded article can be changed by changing the shape and number of magnet pieces. The external die 160 is preferably made of non-magnetic steel so as not to form a magnetic circuit with the orientation magnet.

Once the bonded magnet composition reaches the place where the orientation magnet 170 is embedded, the magnetic material in the bonded magnet composition is oriented along the magnetic field created by the orientation magnet. As is proceeds forward, the bonded magnet composition is heated by a heater (not shown), the thermosetting resin undergoes a crosslinking reaction, and the orientation is fixed.

The orientation magnet 170 here should be embedded in the internal die 150 all the way to the distal end of the external die 160. In other words, the orientation magnet 170 is disposed at the end of the external die 160 in the extrusion direction of the extrusion molding equipment. The "end" of the external die 160 here refers to the end at the point where the inside diameter of the external die 160 touches the bonded magnet composition on the discharge port side. For example, in FIGS. 10 and 14C this refers to the portion shown as the external die end 90. In FIG. 14C, the portion located farthest to the outside on the discharge port side is called the external die outermost part 92. In FIG. 10, the external die end 90 is the same as the external die outermost part.

Figure 12:
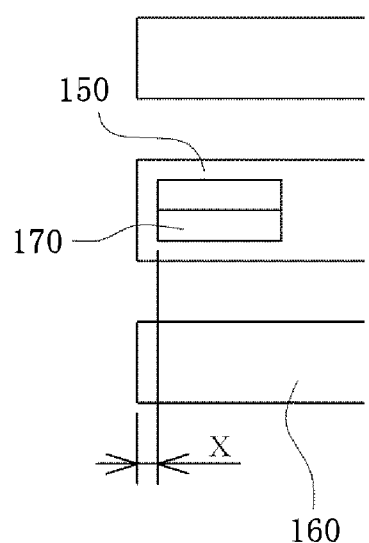
FIG. 12 is a detail view of the mold shown in FIG. 10.

FIG. 12 is a detail view of the mold unit 102 on the discharge port side of the extrusion molding equipment. The distance x here is the distance between the external die end 90 and the end of the orientation magnet 170. If x=0 here, then the external die end 90 and the end of the orientation magnet 170 are disposed in the same plane.

The bonded magnet composition rotates along with the internal die 150 that rotates in conjunction with the screw 140. If there is no orientation magnet 170, the rotation of the bonded magnet composition will be irregular. On the other hand, if the orientation magnet 170 is embedded in the internal die 150, the magnetic attraction between the orientation magnet 170 and the bonded magnet composition causes the internal die 150 and the bonded magnet composition to rotate integrally within the area where the orientation magnet 170 is embedded. It is important to the orientation of the anisotropic magnetic material that this integrated rotation be maintained while the crosslinking reaction is ended, thermosetting is performed, and the composition reaches the discharge port.

Specifically, the integrated rotation of the internal die 150 and the bonded magnet composition makes it possible to obtain a cylindrical bonded magnet in which the various magnetic poles are oriented straight in the longitudinal direction.

Figure 13:
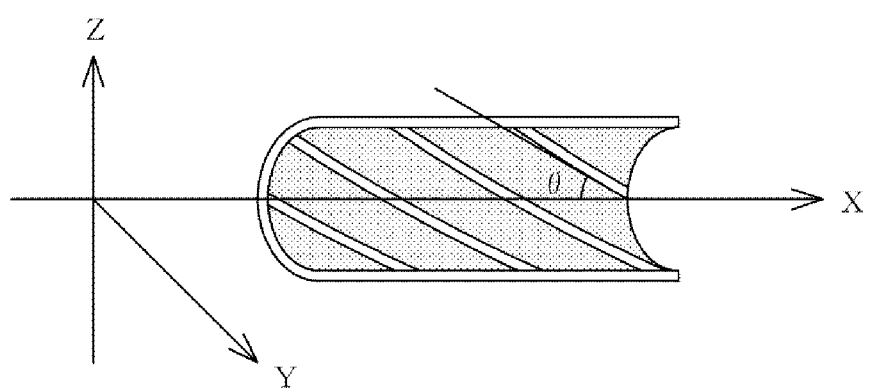
FIG. 13 is a diagram illustrating the angle of orientation of a bonded magnet molded article obtained from the extrusion molding equipment according to the second embodiment.

FIG. 13 is a diagram illustrating the orientation of the bonded magnet, and shows a magnet viewer placed on the inner peripheral side of the bonded magnet molded article. The magnetic poles appear black (gray in the drawing), and the switching between magnetic poles appears white. If the orientation is straight in the longitudinal direction, the orientation angle θ in FIG. 13 is 0°.

In this embodiment, the bonded magnet composition rotates along with the internal die 150 while encountering resistance from the external die 160. If the orientation magnet 170 is disposed more to the inside than the external die end 90, such as when x=5 mm in FIG. 12, then there is no orientation magnet 170 near the discharge port of the die, so there is no effect of attracting the bonded magnet composition, integrated rotation with the internal die 150 is prevented by resistance with the external die 160, and twisting occurs in the molded article. The orientation angle θ in FIG. 13 of the bonded magnet molded article obtained here is approximately 30°, the various magnetic poles have a twisted orientation with respect to the longitudinal direction, and the desired bonded magnet molded article cannot be obtained.

Therefore, in this embodiment the orientation magnet 170 is disposed up to the external die end 90 in order to end the crosslinking reaction and curing the material while integrated rotation is maintained. An example of such a disposition is shown in FIG. 14A.

Figure 14A:
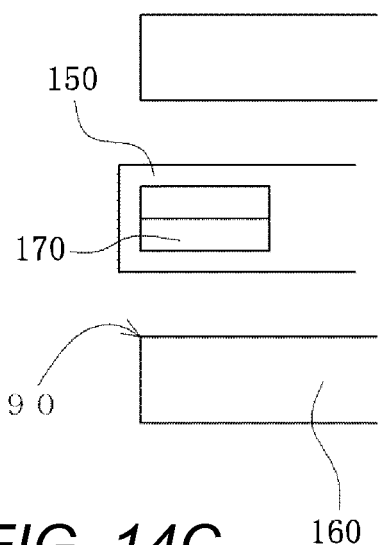
FIGS. 14A to 14D are examples of apart of the extrusion molding equipment according to the second embodiment.

In FIG. 14A, the end of the orientation magnet 170 and the external die end 90 are disposed in the same plane on the discharge port side (extrusion direction). A comparison with the example in FIG. 10 reveals that the orientation magnet 170 is completely embedded in the interior of the internal die 150, rather than being exposed from the internal die 150, and the outermost part of the internal die 150 on the discharge side sticks out past the outermost part of the external die 160. Thus embedding the orientation magnet 170 in the internal die 150 and not exposing it on the outside prevents cracking or chipping of the orientation magnet 170.

Figure 14B:
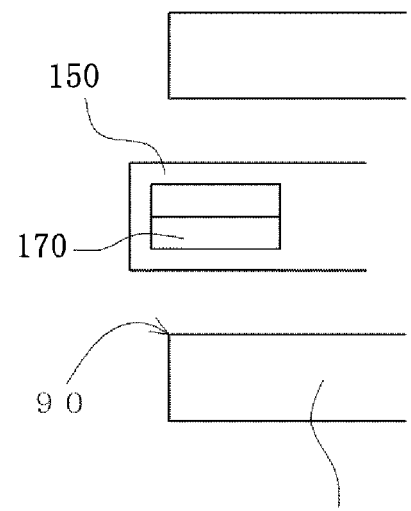
Figure 14C:
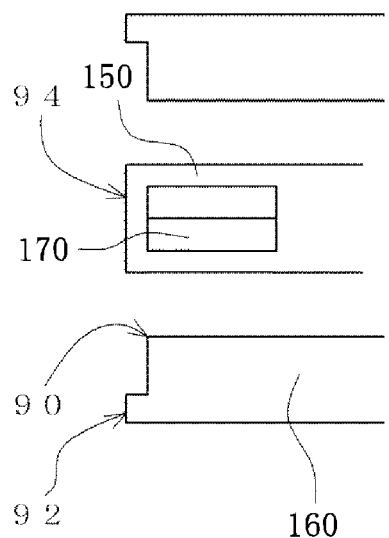

In FIG. 14B, the end of the orientation magnet 170 is disposed to stick out past the external die end 90 on the discharge port side (extrusion direction). There is no problem if the orientation magnet 170 sticks out in this way.

In FIG. 14C, the external die 160 has a stepped part on the discharge port side (extrusion direction), and has the external die outermost part 92 that is farther to the discharge port side than the external die end 90. Furthermore, the entire orientation magnet 170 is embedded in the internal die 150, and an internal die outermost part 94 and the external die outermost part 92 are disposed so as to lie in the same plane.

Figure 14D:
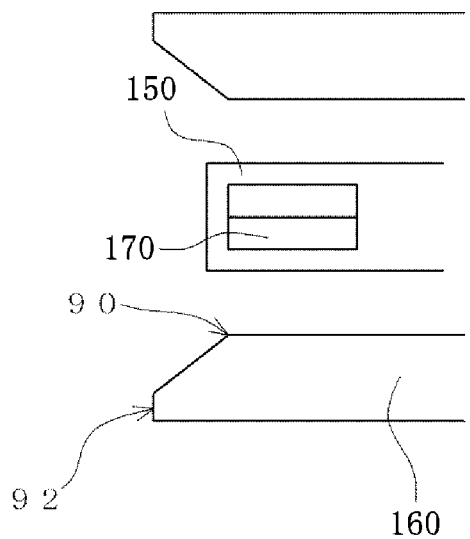

In FIG. 14D, the external die 160 has a tapered shape on the discharge port side (extrusion direction), and has the external die outermost part 92 that is farther to the discharge port side than the external die end 90, just as in the example in FIG. 14C. Furthermore, the entire orientation magnet 170 is embedded in the internal die 150, and the internal die outermost part 94 and the external die outermost part 92 are disposed so as to lie in the same plane.

There will be no twisting so long as the orientation magnet 170 sticks out farther to the discharge port side than the external die end 90, as in the examples above.

The extrusion molding method used in this embodiment is a continuous process, unlike the batch process of injection or compression molding, which are other molding methods commonly used to mold bonded magnets, and therefore the method of this embodiment affords extremely high productivity. Furthermore, because molding can be performed continuously, it is easy to mold long, slender articles that are difficult to obtain by injection molding or compression molding.

The various components that can be used in this embodiment will now be described in detail.

Orientation Magnet 170

The material of the magnet used for the orientation-use permanent magnet preferably has a Br of at least 1T, and an Nd—Fe—B-based sintered magnet or an Sm—Co-based sintered magnet can be used, for example. When a magnet with a high magnetic force is used, the orienting magnetic field is stronger, and the surface magnetic flux density of the bonded magnet is higher.

It is also preferable to use secondary curing of the bonded magnet obtained by extrusion molding as discussed above. A magnetization step may also be included if needed. Performing magnetization further boosts the surface magnetic flux density.

Anisotropic Magnetic Material

Examples of the anisotropic magnetic material used in the second embodiment include those based on ferrite, Sm—Co, Nd—Fe—B, Sm—Fe—N, and so forth. A powdered form is preferable.

Ferrites have a long history and are inexpensive, which makes them more popular, but they have weaker magnetism than rare earths, and their magnetism may not be strong enough if the molded article is small. Therefore, when a bonded magnet with a strong magnetic force needs to be produced, it is preferable to use a rare earth-based magnetic material such as one based on Sm—Co, Nd—Fe—B, or Sm—Fe—N. This is because it is extremely easy to align the direction of magnetization in a rare earth-based anisotropic magnetic powder with the magnetic field applied during orientation, and as a result, the magnetic force of the bonded magnet is stronger. An Sm—Fe—N-based material is preferable because its particle size is approximately 3 μm and the particles are substantially spherical, making them well suited to extrusion molding.

The above-mentioned magnetic materials may be used singly or as a mixture of two or more types. Also, they may be subjected to an antioxidation treatment or coupling treatment as needed.

Thermosetting Resin

A thermosetting resin is used as the resin in the second embodiment. A thermosetting resin involves a crosslinking reaction. The thermosetting resin, which is a monomer prior to molding, is converted into a polymer by a three-dimensional crosslinking reaction brought about by irradiation with UV rays, heating, or the like during or after molding. A thermosetting resin that has undergone the crosslinking reaction will exhibit little volatilization of low molecular-weight components or distortion due to melting of the resin during heating, so such a resin is suited to use at high temperatures.

There are no particular restrictions on thermosetting resins that can be used in the second example, and a variety of thermosetting resins can be used, examples of which include epoxy resins, phenolic resins, unsaturated polyester resins, urea resins, melamine resins, polyimide resins, and allylic resins.

There are no particular restrictions on the epoxy resins that can be used in the second embodiment, but examples include bisphenol A-type epoxy resins, bisphenol F-type epoxy resins, novolac-type epoxy resins, alcohol-type epoxy resins, and other such glycidyl ether-type epoxy resins; aromatic amine-type epoxy resins, aminophenol-type epoxy resins, and other such glycidylamine-type epoxy resins; hydrophthalic acid-type epoxy resins, dimeric acid-type epoxy resins, and other such glycidyl ester-type epoxy resins; alicyclic epoxy resins; and various other such epoxy resins, as well as rubber-modified epoxy resins, brominated epoxy resins, urethane-modified epoxy resins, and other such modified epoxy resins.

There are no particular restrictions on the curing agent used for the above-mentioned epoxy resins, and a wide range of conventional agents can be used, such as primary amines, secondary amines, acid anhydrides, and phenolic resins. These may be used singly or as a mixture of two or more types. The use of a phenolic resin as a curing agent is particularly favorable because of its superior heat resistance and water resistance.

There are no particular restrictions on the curing promoter used for the above-mentioned epoxy resins, but examples include phosphine compounds, phosphonium salts, imidazolium salts, amines, diazabicyclo compounds, tetraphenylborates of diazabicyclo compounds, phenol salts, phenol novolac salts, and 2-ethylhexanoates. Of these curing promoters, the use of an imidazole-based curing promoter is preferable in terms of stable molding because the curing reaction is suppressed while the extrusion screw is not moving.

There are no particular restrictions on the phenolic resins that can be used in the second embodiment, and any conventional type can be used, such as novolac-type phenolic resins, resol-type phenolic resins, aniline, rosin, dicyclopentadiene, modified phenolic resins that have been modified with an unsaturated fatty acid or the like, phenol-modified melamine resins, and various other such compounds with other types of material that have been modified with a phenol. There are no particular restrictions on the curing agent for a novolac-type phenolic resin, but hexamethylenetetraamine or another such amine-based curing agent can be used to advantage.

There are no particular restrictions on the unsaturated polyester resins, and a wide range of conventional types can be used, but examples include diallyl phthalate, diallyl fumarate, divinyl phthalate, and other such polyester resins having two or more unsaturated bonds per molecule.

There are no particular restrictions on the crosslinking agent for the above-mentioned unsaturated polyester resins so long as it has polymerizable double bonds, and a wide range of conventional types can be used, but examples include styrene, diallyl phthalate, methyl methacrylate, divinylbenzene, acrylamide, vinyltoluene, monochlorostyrene, acrylonitrile, triallyl isocyanurate, and other such vinyl monomers and diallyl phthalate prepolymers.

Ordinary peroxides can be used as the curing agent for the above-mentioned unsaturated polyester resins, examples of which include t-butyl peroxyoctoate, benzoyl peroxide, 1,1-di-t-butyl peroxy-3,3,5-trimethylcyclohexane, t-butyl peroxyisopropyl carbonate, t-butyl peroxybenzoate, dicumyl peroxide, di-t-butyl peroxide, lauroyl peroxide, di-t-butyl peroxyisophthalate, 2,5-dimethylhexane, 2,5-dihydroperoxide, cumene hydrogen peroxide, and methyl ethyl ketone peroxide.

Examples of urea resins include various cationic, nonionic, and anionic urea resins. There are no particular restrictions on the curing agent used in the curing reaction of the above-mentioned urea resin, but examples include inorganic acids, organic acids, acidic sodium sulfate, and other such non-latent curing agents composed of an acidic salt; and carboxylic acid esters, acid anhydrides, salts such as ammonium chloride and ammonium phosphate, and other such latent curing agents. A latent curing agent is particularly favorable in terms of shelf life and so on.

Examples of melamine resins include a melamine resin by itself, as well as a urea-melamine resin, which is a product of modification with a urea resin.

Examples of polyimide resins include a polyimide resin obtained by reacting a diamine with a tetracarboxylic acid or an anhydride thereof, as well as maleimide-modified epoxy resins and so forth.

The allyl resin is one obtained by polymerization and curing reaction of a diallyl phthalate monomer. Examples of the above-mentioned dialkyl phthalate monomers include ortho-, iso- and tere-monomers. There are no particular restrictions on the curing promoter, but a combination of t-butyl perbenzoate and di-t-butyl peroxide can be used to advantage.

These thermosetting resins can be used singly or in mixtures of two or more types.

The blend ratio of the magnetic material and the resin will depend on the resintype, but it is preferable for the ratio of the magnetic material to the entire bonded magnet composition to be from 45 to 65 vol %. An antioxidant, lubricant, or the like can also be added.

Working examples of the second embodiment will now be described in detail. It should go without saying that the present invention is not limited to the following working examples alone.

Working Example 1

Preparation of Magnetic Material

The magnetic material is an anisotropic Sm—Fe—N-based magnetic material (average particle size of 3 μm).

Production of Magnet Composition

An epoxy resin or other such thermosetting resin (main agent) and a curing agent, and if needed, a small amount (as needed) of a curing promoter and other such additives were added to the above-mentioned Sm—Fe—N-based magnetic material, after which the components were thoroughly mixed in a mixer. The mixed powder thus obtained was kneaded in a biaxial kneader at a temperature low enough that almost no curing reaction took place, and then cooled, after which this product was cut to a suitable size to obtain a bonded magnet composition.

Extrusion Molding

FIG. 10 shows the extrusion molding equipment used in Working Example 1 here. The inside diameter of the external die 160 is 19 mm, and the outside diameter of the internal die 150 is 17 mm. As shown in FIG. 11, the orientation magnet 170 was given a cylindrical shape by assembling six magnet pieces. The assembled orientation magnet 170 emits magnetic force from six poles on the outer peripheral side. This was embedded in the internal die 150. At this point the distance x between the orientation magnet 170 and the external die 160 shown in FIG. 12 is 0 mm, and the end of the orientation magnet 170 and the external die end 90 is arranged in the same plane. The temperature was set to 110° C. at the screw unit 101, and to 180° C. at the mold unit 102. Thus, an inner peripheral 12-pole, anisotropic, cylindrical bonded magnet with an outside diameter of 19 mm, an inside diameter of 17 mm, and a length of 1000 mm was obtained. This was then cut to a length of 20 mm using a cutting machine.

Magnetization Step

The molded article thus obtained is magnetized with a magnetization yoke. The magnetization conditions are an electrostatic capacitance of 1000 μF, a voltage of 2.5 kV, and a current of 18.0 kA.

Evaluation

Figure 15:
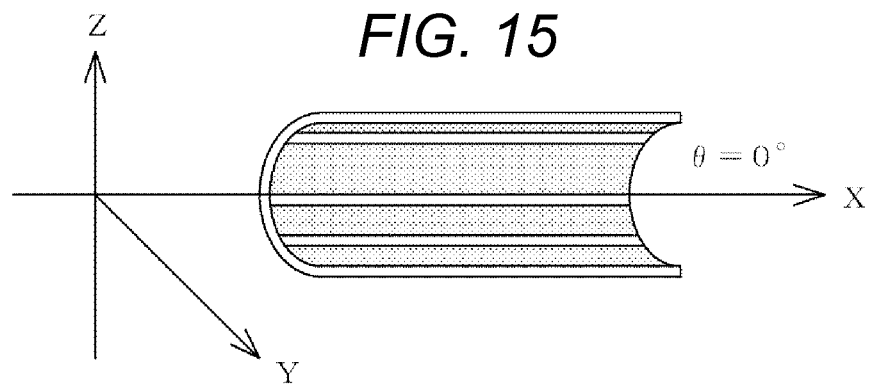
FIG. 15 is a diagram illustrating the angle of orientation of a bonded magnet molded article obtained in a working example of the second embodiment.

To evaluate the orientation angle, the bonded magnet molded article was split in half, and a magnet viewer was placed on the inner peripheral surface of the molded article to observe it. The result is shown in FIG. 15. The orientation angle θ here was 0°.

To evaluate the surface magnetic flux density, a magnet analyzer was used to measure the surface magnetic flux density at the inner periphery of a cylindrical bonded magnet. In this measurement, the cylindrical bonded magnet was fixed to a 360° rotating stage of the magnet analyzer, the probe was brought into contact with the inner peripheral side face of the cylindrical bonded magnet, and the stage was rotated 360°. The surface magnetic flux density here was 2300 G.

Comparative Example 1

Figure 16:
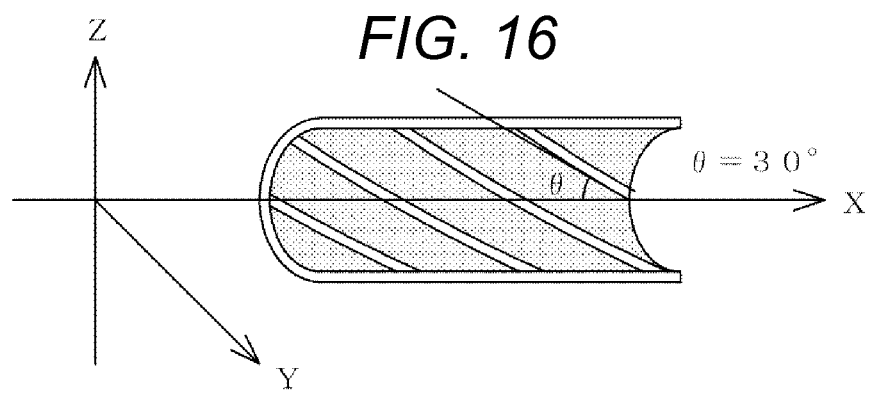
FIG. 16 is a diagram illustrating the angle of orientation of a bonded magnet molded article obtained in Comparative Example 1.

An anisotropic cylindrical bonded magnet was produced by the same method as in Working Example 1, except for using a mold in which the distance x shown in FIG. 12 was 5 mm, that is, a mold in which the external die end 90 stuck out farther to the discharge port side (extrusion direction) than the end of the orientation magnet 170. As shown in FIG. 16, in the orientation angle evaluation, the orientation angle θ was 30° and the surface magnetic flux density was 1700 G.

Comparative Example 2

Figure 17:
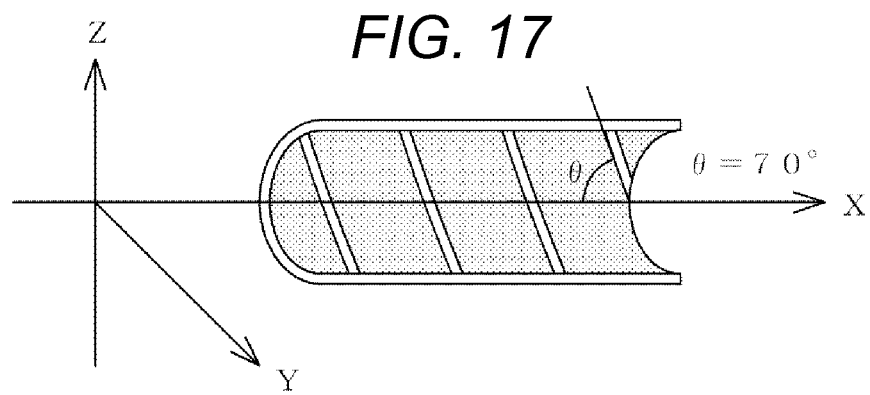
FIG. 17 is a diagram illustrating the angle of orientation of a bonded magnet molded article obtained in Comparative Example 2.

An anisotropic cylindrical bonded magnet was produced by the same method as in Working Example 1, except for using a mold in which the distance x shown in FIG. 12 was 10 mm, that is, a mold in which the external die end 90 stuck out farther to the discharge port side (extrusion direction) than the end of the orientation magnet 170. As shown in FIG. 17, in the orientation angle evaluation, the orientation angle θ was 70° and the surface magnetic flux density was 1300 G.

Table 2 shows the orientation angles and surface magnetic flux densities in the working and comparative examples.

TABLE 2

| | Mold Distance x between external die end and orientation magnet end (mm) | Bonded magnet molded article | |
| --- | --- | --- | --- |
| | | Orientation angle (deg) | Surface magnetic flux density (G) |
| Working Example 1 | 0 | 0 | 2300 |
| Comparative Example 1 | 5 | 30 | 1700 |
| Comparative Example 2 | 10 | 70 | 1300 |

As can be seen in Table 2, in Working Example 1 the orientation is not disrupted as it is in the comparative examples, and the surface magnetic flux density is higher than in the comparative examples.

As described above, the extrusion molding equipment according to the second embodiment is an equipment for the extrusion molding of a bonded magnet composition containing an anisotropic magnetic material and a thermosetting resin, the extrusion molding equipment including an external die having a through-hole to form an outer periphery of a cylindrical bonded magnet, an internal die disposed in this through-hole to form an inner periphery of the bonded magnet, and a screw to extrude the material of the bonded magnet. The internal die is connected to the screw to be rotatable. An orientation magnet is embedded in the internal die. The orientation magnet is disposed all the way to the external die end in an extrusion direction of the extrusion molding equipment.

In the extrusion molding equipment according to the second embodiment, the orientation magnet end and the external die end are disposed in the same plane in the extrusion direction of the extrusion molding equipment.

In the extrusion molding equipment according to the second embodiment, the orientation magnet is disposed to stick out beyond the external die end in the extrusion direction of the extrusion molding equipment.

In the extrusion molding equipment according to the second embodiment, the orientation magnet is exposed from the internal die.

In the extrusion molding equipment according to the second embodiment, the outermost part of the internal die and the external die end are disposed in the same plane in the extrusion direction of the extrusion molding equipment.

The extrusion molding method according to the second embodiment is a method for using a screw-type extruder for the extrusion molding of a composition in which an anisotropic magnetic material and a thermosetting resin are mixed, wherein an extrusion molding equipment in which an orientation magnet is embedded in an internal die connected to the screw to be rotatable, and the orientation magnet is disposed all the way to the external die end in the extrusion direction of the extrusion molding equipment, is used to thermoset and mold the composition while the internal die and the composition are integrally rotated.

In the extrusion molding method according to the second embodiment, the anisotropic magnetic material is an Sm—Fe—N-based magnetic powder.

In the extrusion molding method according to the second embodiment, the thermosetting resin is an epoxy resin.

Third Embodiment

The orientation magnet was provided to the internal die in the first and second embodiments above, but the orientation magnet may instead be provided to the external die, as described below.

Figure 18:
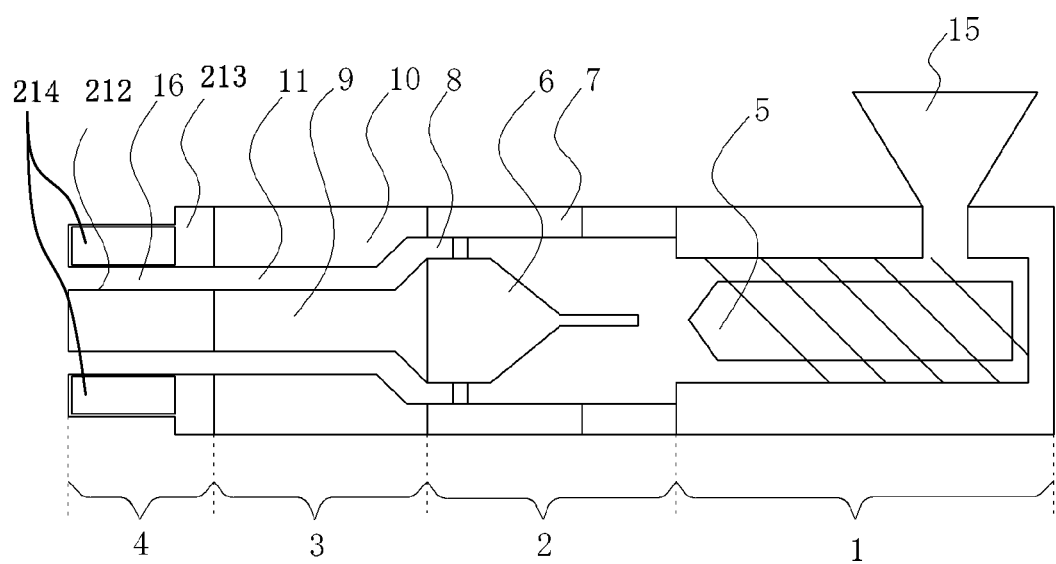
FIG. 18 is a cross section of the extrusion molding equipment according to a third embodiment.

FIG. 18 is a cross section of an extrusion molding equipment according to the third embodiment. The configuration of this extrusion molding equipment is basically the same as that of the extrusion molding equipment according to the first embodiment, but differs from the extrusion molding equipment according to the first embodiment in that an orientation magnet 214 is provided to an external die 213. As shown in FIG. 18, this extrusion molding equipment has a plasticizer unit 1, a spider unit 2, a mold unit 3, and a molding unit 4. A channel 16 is formed by an internal die 212 and the external die 213 in the molding unit 4.

The orientation magnet 214 is embedded in the external die 213. The orientation magnet 214 is embedded at the end on the discharge port side of the external die 213, and disposed on the outer peripheral side of the internal die 212. When the molten bonded magnet composition passes through the channel 16, the particles of the magnetic material are readily oriented in the magnetization direction. After this magnetic material has passed under the orienting magnetic field, the resin is cured, which gives a cylindrical bonded magnet (molded article).

The end of the orientation magnet 214 is disposed at substantially the same position as the end of the external die 213 in the axial direction of the orientation magnet 214 (the extrusion direction of the extrusion molding equipment). The end of the internal die 212 is disposed at substantially the same position in the axial direction as the end of the external die 213. The end face provided at the end of the internal die 212 is disposed at substantially the same position in the axial direction as the end face provided at the end of the external die 213.

FIGS. 19A to 22B are oblique views of the orientation magnet according to the third embodiment, and cross sections along the dotted lines shown in these oblique views. The arrows indicate the magnetization direction. As shown in these drawings, with the orientation magnet according to the third embodiment, the same poles of two magnets repel each other in the longitudinal direction of the orientation magnet (that is the extrusion direction of the extrusion molding equipment), creating a powerful magnetic field.

Specifically, many different aspects (orientation magnets 250 to 280) are conceivable for the configuration of the orientation magnet 214 according to the third embodiment as discussed in detail below in (1) to (4), but the present invention is not limited to these.

Figure 19A:
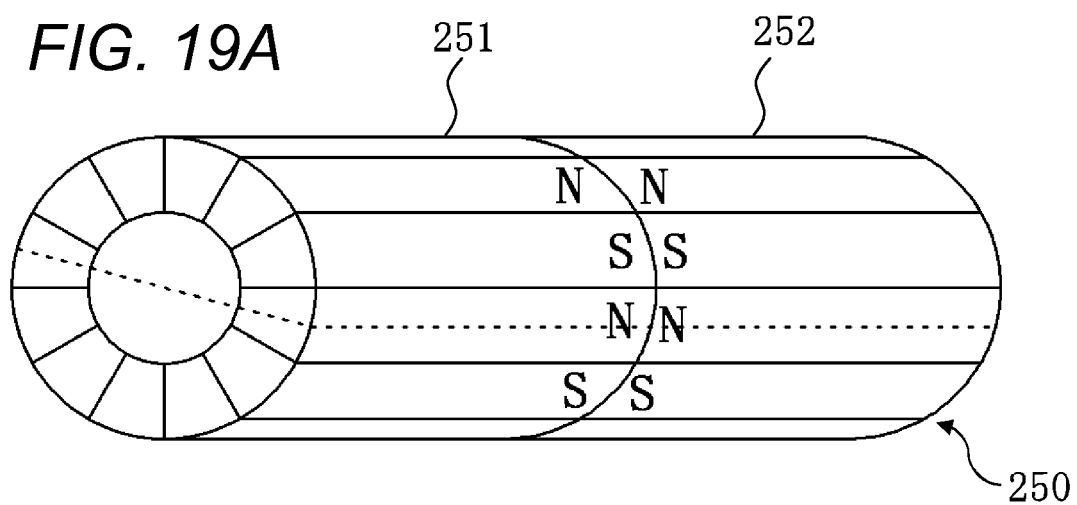
FIGS. 19A and 19B are an oblique view and cross section of an orientation magnet in Working Example 1 of the third embodiment.

(1) As shown in FIG. 19A, an orientation magnet 250 has a cylindrical first permanent magnet 251 and a cylindrical second permanent magnet 252. The first permanent magnet 251 has N poles and S poles disposed alternately in the circumferential direction. More specifically, the first permanent magnet 251 has a plurality of magnet pieces arranged in the circumferential direction so that the N poles and S poles appear alternately in the circumferential direction. The second permanent magnet 252 also has N poles and S poles disposed alternately in the circumferential direction. More specifically, the second permanent magnet 252 has a plurality of magnet pieces arranged in the circumferential direction so that the N poles and S poles appear alternately in the circumferential direction. The second permanent magnet 252 is disposed adjacent to the first permanent magnet 251 in the axial direction. The first permanent magnet 251 and the second permanent magnet 252 are disposed so that their same poles are opposite each other in the extrusion direction (the axial direction of the orientation magnet 250). More precisely, the N poles and S poles of the first permanent magnet 251 are disposed so as to repel the N poles and S poles of the second permanent magnet 252 parallel to the extrusion direction.

The orientation magnet 250 shown in FIG. 19A may constitute one set, with a plurality of sets connected together with yokes (made of iron, for example) in between. The same applies to the other modification examples discussed below.

Figure 19B:
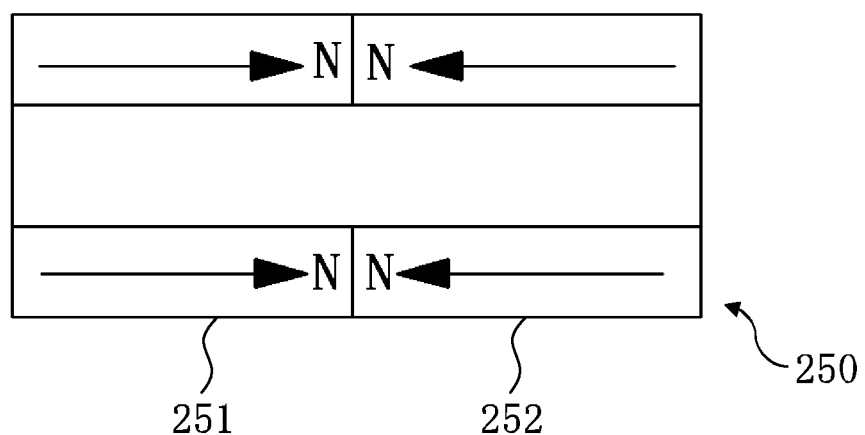

FIG. 19B is a cross section in which the orientation magnet 250 shown in FIG. 19A has been cut along the dotted line in FIG. 19A. As shown in FIG. 19B, the magnetization directions (the point of each arrow is the N pole) of the first permanent magnet 251 and the second permanent magnet 252 face each other at the boundary where the first permanent magnet 251 and the second permanent magnet 252 are connected.

By thus providing the orientation magnet 250 to the external die 213, a powerful magnetic force can be emitted inward (in particular, toward the channel 16 inside the molding unit 4) from the face where the first permanent magnet 251 and the second permanent magnet 252 are connected.

Figure 20A:
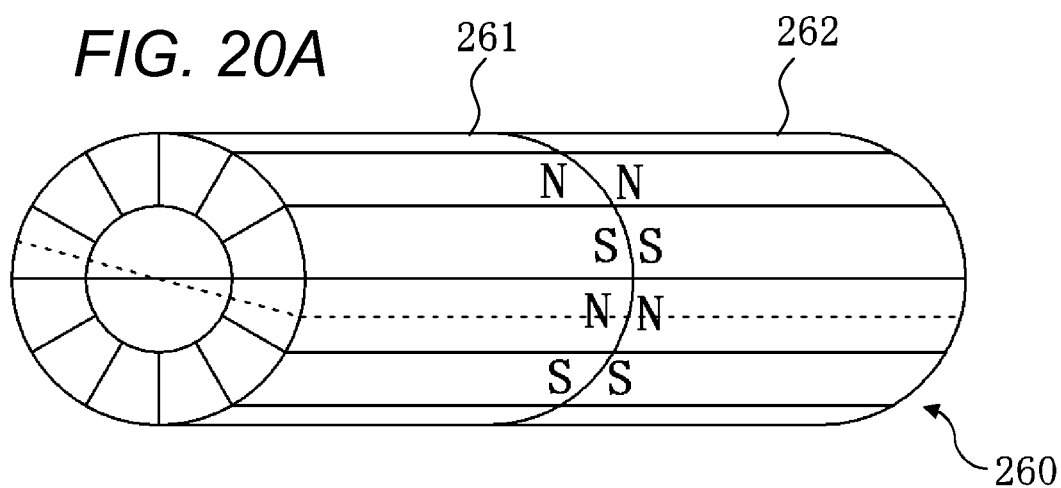
FIGS. 20A and 20B are an oblique view and cross section of an orientation magnet in Working Example 2 of the third embodiment.

(2) As shown in FIG. 20A, an orientation magnet 260 has a cylindrical first permanent magnet 261 and a cylindrical second permanent magnet 262. The first permanent magnet 261 has N poles and S poles disposed alternately in the circumferential direction. More specifically, the first permanent magnet 261 has a plurality of magnet pieces arranged in the circumferential direction so that the N poles and S poles appear alternately in the circumferential direction. The second permanent magnet 262 also has N poles and S poles disposed alternately in the circumferential direction. More specifically, the second permanent magnet 262 has a plurality of magnet pieces arranged in the circumferential direction so that the N poles and S poles appear alternately in the circumferential direction. The second permanent magnet 262 is disposed adjacent to the first permanent magnet 261 in the axial direction. The first permanent magnet 261 and the second permanent magnet 262 are disposed so that their same poles are opposite each other in the extrusion direction (the axial direction of the orientation magnet 260).

Figure 20B:
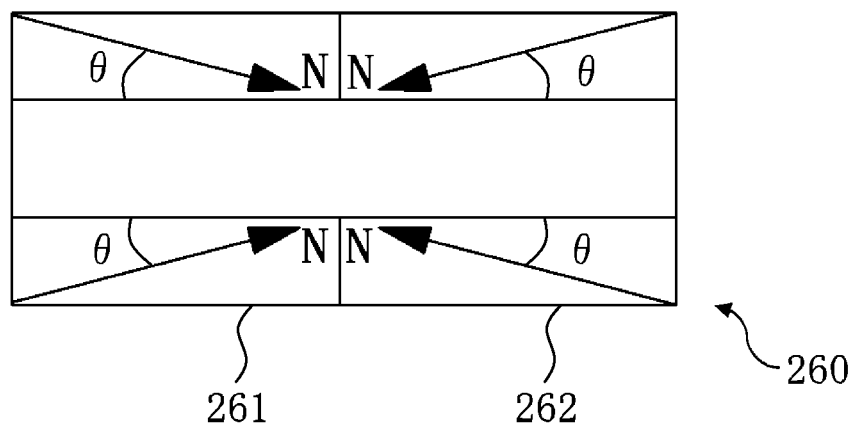

FIG. 20B is a cross section in which the orientation magnet 260 shown in FIG. 20A has been cut along the dotted line in FIG. 20A. As shown in FIG. 20B, the magnetization directions (the point of each arrow is the N pole) of the first permanent magnet 261 and the second permanent magnet 262 face each other diagonally toward the inner peripheral side and toward the boundary where the first permanent magnet 261 and the second permanent magnet 262 are connected. Thus, the first permanent magnet 261 and the second permanent magnet 262 are disposed so that their N poles and S poles repel each other in directions inclined with respect to the extrusion direction (in FIG. 20B, the diagonal directions of the rectangular cross sections of the magnet pieces) and so that magnetization directions face toward inner peripheries in the circumferential direction.

The "inclination direction" here is the diagonal direction of the angle θ in FIG. 20B, and is a direction with an angle of more than 0 degrees and less than 90 degrees with respect to the extrusion direction of the bonded magnet composition (that is, the axial direction of the orientation magnet 260). The same applies to the other modification examples discussed below.

Thus providing the orientation magnet 260 to the external die 213 allows a powerful magnetic force to be emitted inward (and particularly toward the channel 16 inside the molding unit 4) from the face where the first permanent magnet 261 and the second permanent magnet 262 are connected.

Figure 21A:
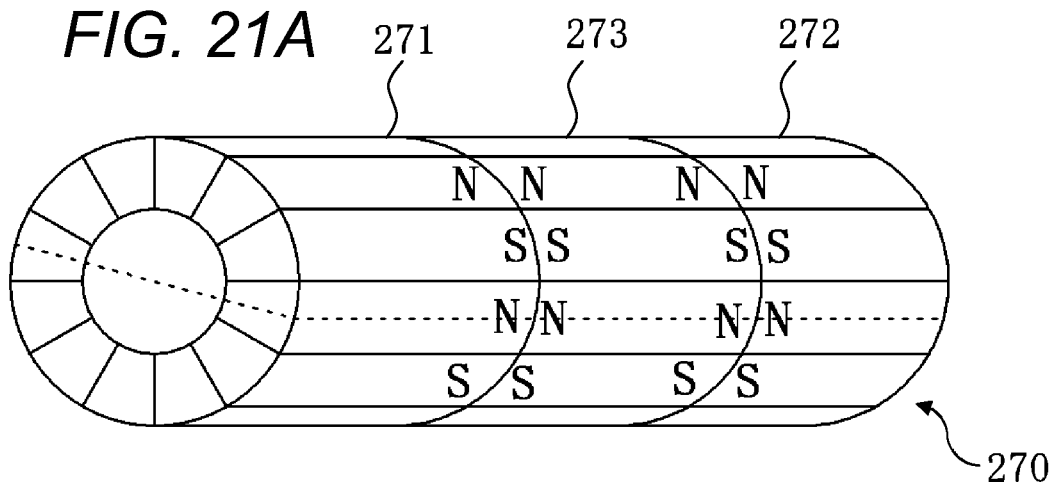
FIGS. 21A and 21B are an oblique view and cross section of an orientation magnet in Working Example 3 of the third embodiment.

(3) As shown in FIG. 21A, an orientation magnet 270 has a cylindrical first permanent magnet 271, a cylindrical second permanent magnet 272, and a cylindrical third permanent magnet 273. The first permanent magnet 271 has N poles and S poles disposed alternately in the circumferential direction. More specifically, the first permanent magnet 271 has a plurality of magnet pieces arranged in the circumferential direction so that N poles and S poles appear alternately in the circumferential direction. The second permanent magnet 272 also has N poles and S poles disposed alternately in the circumferential direction. More specifically, the second permanent magnet 272 has a plurality of magnet pieces arranged in the circumferential direction so that N poles and S poles appear alternately in the circumferential direction.

The second permanent magnet 272 is disposed adjacent to the first permanent magnet 271 in the axial direction, but the third permanent magnet 273 is disposed between the first permanent magnet 271 and the second permanent magnet 272 in the axial direction. The third permanent magnet 273 has N poles and S poles that are disposed alternately in the radial direction. The third permanent magnet 273 has a plurality of magnet pieces arranged in the circumferential direction so that the N poles and S poles appear alternately in the circumferential direction.

The first permanent magnet 271 and the third permanent magnet 273 are disposed so that their same poles are opposite each other in the extrusion direction (the axial direction of the orientation magnet 270). Also, the second permanent magnet 272 and the third permanent magnet 273 are disposed so that their same poles are opposite each other in the extrusion direction (the axial direction of the orientation magnet 270).

Figure 21B:
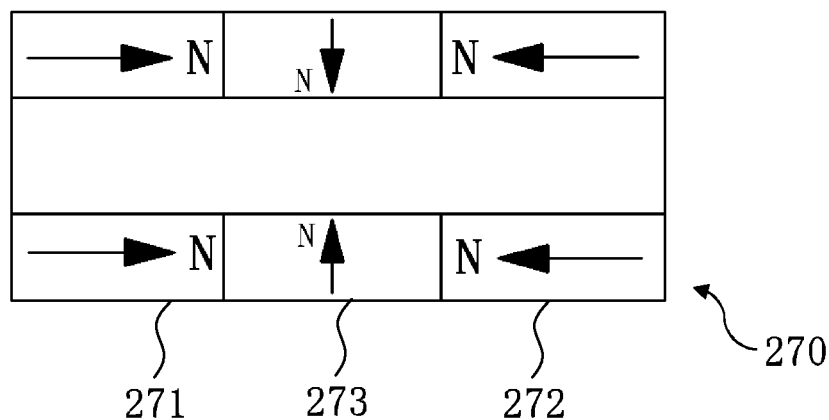

FIG. 21B is a cross section in which the orientation magnet shown in FIG. 21A has been cut along the dotted line in FIG. 21A. As shown in FIG. 21B, the magnetization directions (the point of each arrow is the N pole) of the first and second permanent magnets 271 and 272 are perpendicular to the magnetization direction of the third permanent magnet 273. The magnetization directions (the point of each arrow is the N pole) of the first and second permanent magnets 271 and 272 face toward each other and parallel to the extrusion direction, and face toward the third permanent magnet 273. The magnetization direction of the third permanent magnet 273 faces the inner peripheral side of the orientation magnet 270.

By thus providing the orientation magnet 270 to the external die 213, an even more powerful magnetic force can be emitted by the orientation magnet 270 as a whole because of the magnetic force facing inward (in particular, toward the channel 16 inside the molding unit 4) from the interface where the first permanent magnet 271 and the third permanent magnet 273 are connected and from the interface where the second permanent magnet 272 and the third permanent magnet 273 are connected, and the magnetic force facing inward (in particular, toward the channel 16 inside the molding unit 4) from the center of the third permanent magnet 273.

Figure 22A:
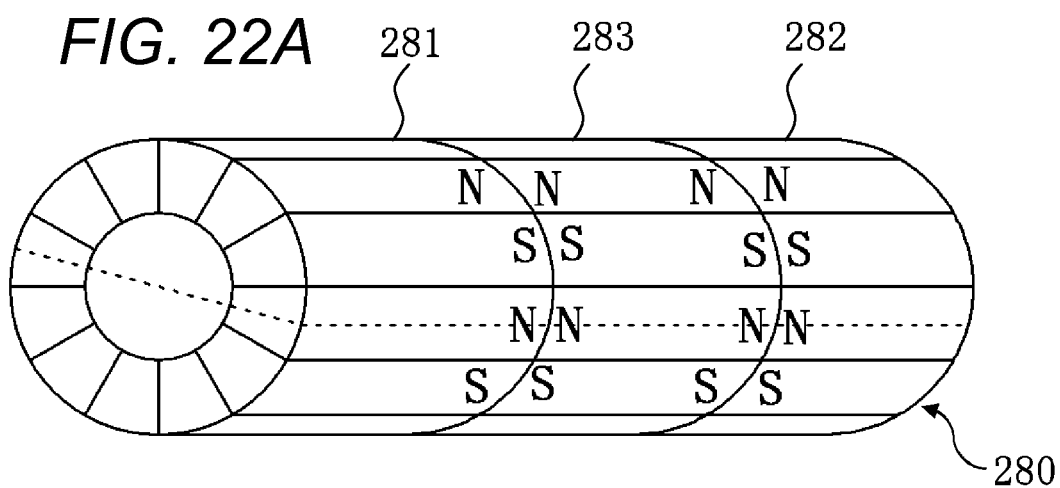
FIGS. 22A and 22B are an oblique view and cross section of an orientation magnet in Working Example 4 of the third embodiment.

(4) As shown in FIG. 22A, an orientation magnet 280 has a cylindrical first permanent magnet 281, a cylindrical second permanent magnet 282, and a cylindrical third permanent magnet 283. The first permanent magnet 281 has N poles and S poles disposed alternately in the circumferential direction. More specifically, the first permanent magnet 281 has a plurality of magnet pieces arranged in the circumferential direction so that the N poles and S poles appear alternately in the circumferential direction. The second permanent magnet 282 also has N poles and S poles disposed alternately in the circumferential direction. More specifically, the second permanent magnet 282 has a plurality of magnet pieces arranged in the circumferential direction so that the N poles and S poles appear alternately in the circumferential direction.

The second permanent magnet 282 is disposed adjacent to the first permanent magnet 281 in the axial direction, but the third permanent magnet 283 is disposed between the first permanent magnet 281 and the second permanent magnet 282 in the axial direction. The third permanent magnet 283 has N poles and S poles that are disposed alternately in the radial direction. The third permanent magnet 283 has a plurality of magnet pieces arranged in the circumferential direction so that the N poles and S poles appear alternately in the circumferential direction.

The first permanent magnet 281 and the third permanent magnet 283 are disposed so that their same poles are opposite each other in the extrusion direction (the axial direction of the orientation magnet 280). Also, the second permanent magnet 282 and the third permanent magnet 283 are disposed so that their same poles are opposite each other in the extrusion direction (the axial direction of the orientation magnet 280).

Figure 22B:
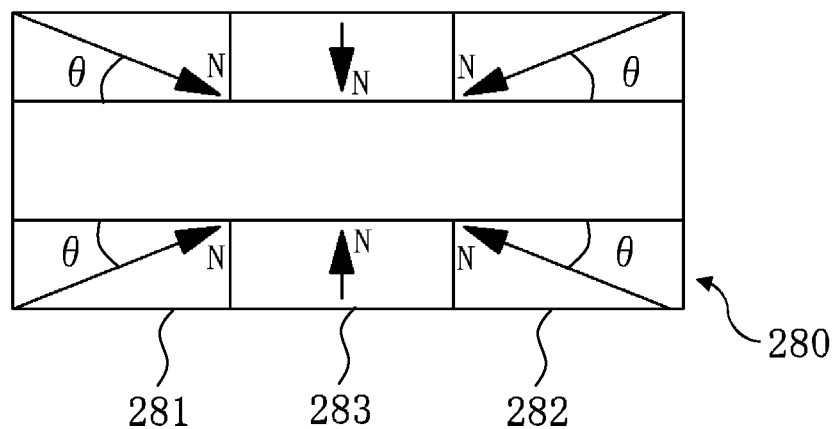

FIG. 22B is a cross section in which the orientation magnet 280 shown in FIG. 22A has been cut along the dotted line in FIG. 22A. As shown in FIG. 22B, the magnetization directions (the point of each arrow is the N pole) of the first permanent magnet 281 face each other in inclined directions toward the inner peripheral side and toward the boundary where the first permanent magnet 281 and the third permanent magnet 283 are connected. Also, the magnetization directions (the point of each arrow is the N pole) of the second permanent magnet 282 face in inclined directions each other toward the inner peripheral side and toward the boundary where the second permanent magnet 282 and the third permanent magnet 283 are connected. As shown in FIG. 22B, the magnetization directions of the first permanent magnet 281 and the second permanent magnet 282 are diagonals in the rectangular cross section of the magnet pieces. The magnetization direction of the third permanent magnet 283 faces the inner peripheral side of the orientation magnet 280.

The "inclined directions" here is the direction of the angle θ in FIG. 22B, and shall refer to a direction at an angle of more than 0 degrees and less than 90 degrees with respect to the extrusion direction of the bonded magnet composition (that is, the axial direction of the orientation magnet 280).

Here, the first and second permanent magnets 281 and 282 are such that the magnetization directions linking the N poles and S poles are inclined to the extrusion direction (in FIG. 22B, the diagonal directions of the rectangular cross sections of the magnet pieces), and an orientation magnet is configured such that these repel a third permanent magnet 283 at an inner periphery in the circumferential direction.

By thus providing the orientation magnet 280 to the external die 213, an even more powerful magnetic force can be emitted because of the magnetic force facing inward (in particular, toward the channel 16 inside the molding unit 4) from the interface where the first permanent magnet 281 and the third permanent magnet 283 are connected and from the interface where the second permanent magnet 282 and the third permanent magnet 283 are connected, and the magnetic force facing inward (in particular, toward the channel 16 inside the molding unit 4) from the center of the third permanent magnet 283.

The materials used in the orientation magnet in the third embodiment can be the same as the materials of the orientation magnets in the first and second embodiments above.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a cylindrical bonded magnet, the method comprising:
   filling a molding space having a cylindrical shape with a bonded magnet composition containing a magnetic material and a resin;
   orienting magnetically the magnetic material disposed in the molding space using an orientation magnet; and
   extruding a molten bonded magnet composition from the molding space in an axial direction of the orientation magnet to mold the molten bonded magnet, the orientation magnet including
      a first permanent magnet having a solid cylindrical shape and having N poles and S poles disposed alternately in a circumferential direction, and
      a second permanent magnet having a solid cylindrical shape and having N poles and S poles disposed alternately in the circumferential direction, the second permanent magnet being disposed adjacent to the first permanent magnet in the axial direction, the first and second permanent magnets being disposed such that the N poles and S poles of the first permanent magnet repel the N poles and S poles of the second permanent magnet adjacent thereto in the axial direction.

2. The method of manufacturing a cylindrical bonded magnet according to claim 1, wherein the orientation magnet includes a third permanent magnet having N poles and S poles disposed alternately in a radial direction facing radially outward, the third permanent magnet being disposed between the first permanent magnet and the second permanent magnet in the axial direction.

3. The method of manufacturing a cylindrical bonded magnet according to claim 1, wherein a magnetization direction of each of the first and second permanent magnets is radially outward inclined at an angle of more than 0 degrees and less than 90 degrees with respect to the axial direction.

4. The method of manufacturing a cylindrical bonded magnet according to claim 1, wherein the magnetic material comprises an Sm—Fe—N-based magnetic material.

5. The method of manufacturing a cylindrical bonded magnet according to claim 1,
wherein the bonded magnet composition contains an anisotropic magnetic material and a thermosetting resin,
wherein the molding space is defined by an external die having a through-hole, and an internal die disposed in the through-hole,
wherein the orientation magnet is embedded in the internal die,
wherein the internal die is connected to a screw provided to extrude the bonded magnet composition, and
wherein a position of an end of the orientation magnet is substantially same as a position of an end of the external die in the axial direction.

6. The method of manufacturing a cylindrical bonded magnet according to claim 5, wherein a position of an end face provided at the end of the orientation magnet is same as a position of an end face provided at the end of the external die in the axial direction.

7. The method of manufacturing a cylindrical bonded magnet according to claim 5, wherein the end of the orientation magnet sticks out beyond the end of the external die.

8. The method of manufacturing a cylindrical bonded magnet according to claim 5, wherein the end of the orientation magnet is exposed from the internal die.

9. The method of manufacturing a cylindrical bonded magnet according to claim 5, wherein a position of an end face of the internal die is same as a position of an end face provided at the end of the external die in the axial direction.

10. The method of manufacturing a cylindrical bonded magnet according to claim 5, wherein the thermosetting resin comprises an epoxy resin.

11. A manufacturing equipment for a cylindrical bonded magnet, comprising: an external die having a through-hole; an internal die disposed in the through-hole, the internal die defining, along with the external die, a molding space having a cylindrical shape, the molding space being provided to be filled with a bonded magnet composition containing a magnetic material and a resin; an orientation magnet to magnetically orient the magnetic material disposed in the molding space; and a screw to extrude a molten bonded magnet composition in an axial direction of the orientation magnet, the orientation magnet including a first permanent magnet having a solid cylindrical shape and having N poles and S poles disposed alternately in a circumferential direction, and a second permanent magnet having a solid cylindrical shape and having N poles and S poles disposed alternately in the circumferential direction, the second permanent magnet being disposed adjacent to the first permanent magnet in the axial direction, the first and second permanent magnets being disposed such that the N poles and S poles of the first permanent magnet repel the N poles and S poles of the second permanent magnet adjacent thereto in the axial direction.

12. The manufacturing equipment for a cylindrical bonded magnet according to claim 11, wherein the orientation magnet includes a third permanent magnet having N poles and S poles disposed alternately in a radial direction facing radially outward, the third permanent magnet being disposed between the first permanent magnet and the second permanent magnet in the axial direction.

13. The manufacturing equipment for a cylindrical bonded magnet according to claim 11, wherein a magnetization direction of each of the first and second permanent magnets is radially outward inclined at an angle of more than 0 degrees and less than 90 degrees with respect to the axial direction.

14. The manufacturing equipment for a cylindrical bonded magnet according to claim 11, wherein the magnetic material comprises an Sm—Fe—N-based magnetic material.

15. The manufacturing equipment for a cylindrical bonded magnet according to claim 11,
wherein the bonded magnet composition contains an anisotropic magnetic material and a thermosetting resin,
wherein the orientation magnet is embedded in the internal die,
wherein the internal die is connected to the screw, and
wherein a position of an end of the orientation magnet is substantially same as a position of an end of the external die in the axial direction.

16. The manufacturing equipment for a cylindrical bonded magnet according to claim 15, wherein a position of an end face provided at the end of the orientation magnet is same as a position of an end face provided at the end of the external die in the axial direction.

17. The manufacturing equipment for a cylindrical bonded magnet according to claim 15, wherein the end of the orientation magnet sticks out beyond the end of the external die.

18. The manufacturing equipment for a cylindrical bonded magnet according to claim 15, wherein the end of the orientation magnet is exposed from the internal die.

19. The manufacturing equipment for a cylindrical bonded magnet according to claim 15, wherein a position of an end face of the internal die is same as a position of an end face provided at the end of the external die in the axial direction.

20. The manufacturing equipment for a cylindrical bonded magnet according to claim 15, wherein the thermosetting resin comprises an epoxy resin.

* * * * *